3,351,509
METHOD OF MAKING A REINFORCED HOLLOW PLASTIC ARTICLE OF WRAPPED TAPES OF FIBROUS MATERIAL
Henry M. Richardson, Somers, Conn., Alfred C. Alberghini, Sand Springs, Okla., Fred E. Wiley, Longmeadow, Mass., and Wesley S. Larson, Hazardville, Conn., assignors to The Youngstown Sheet and Tube Company, Boardman, Ohio, a corporation of Ohio
Original application Dec. 28, 1962, Ser. No. 248,058, now Patent No. 3,256,128, dated June 14, 1966. Divided and this application Sept. 13, 1965, Ser. No. 486,678
5 Claims. (Cl. 156—195)

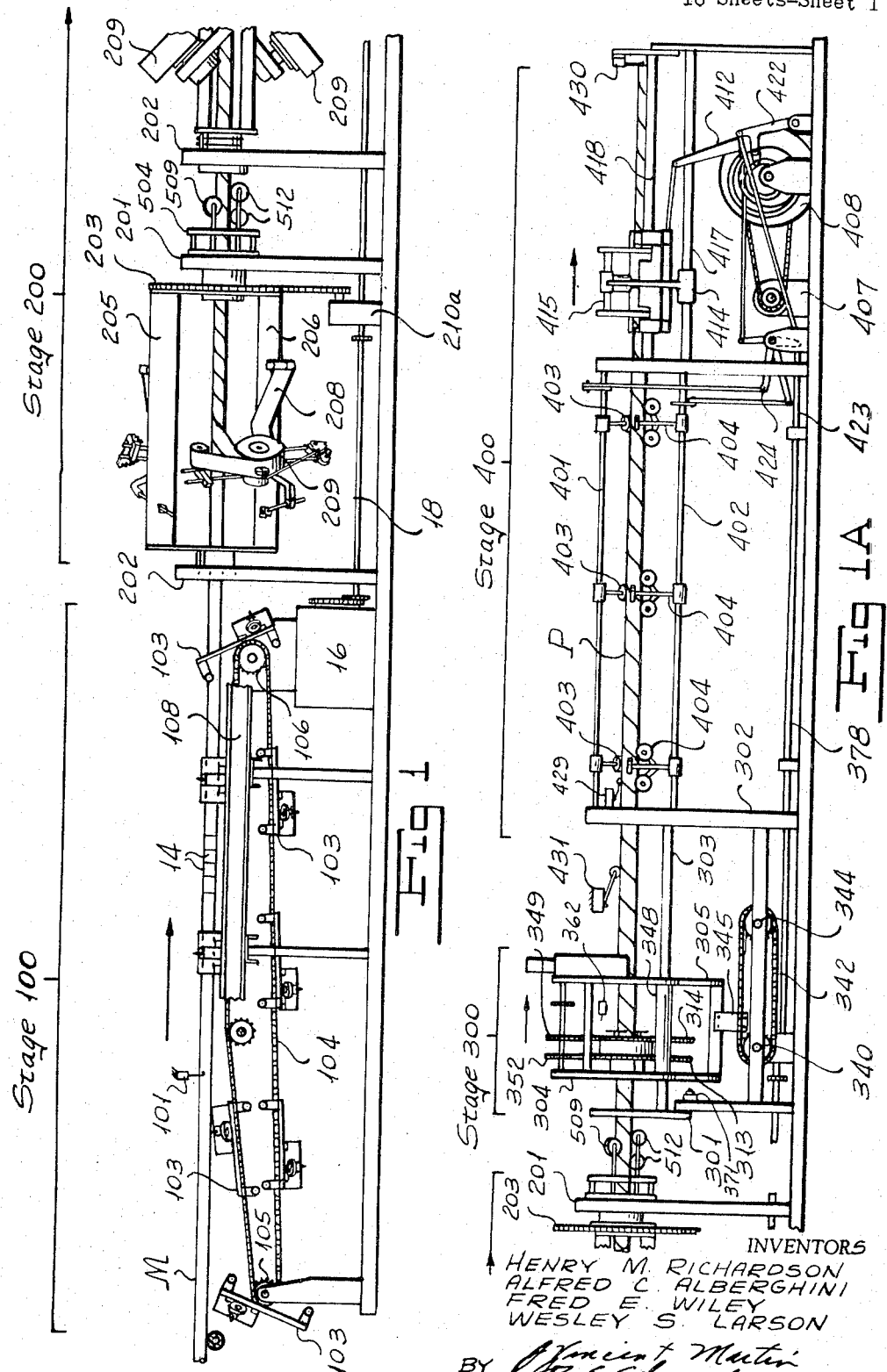

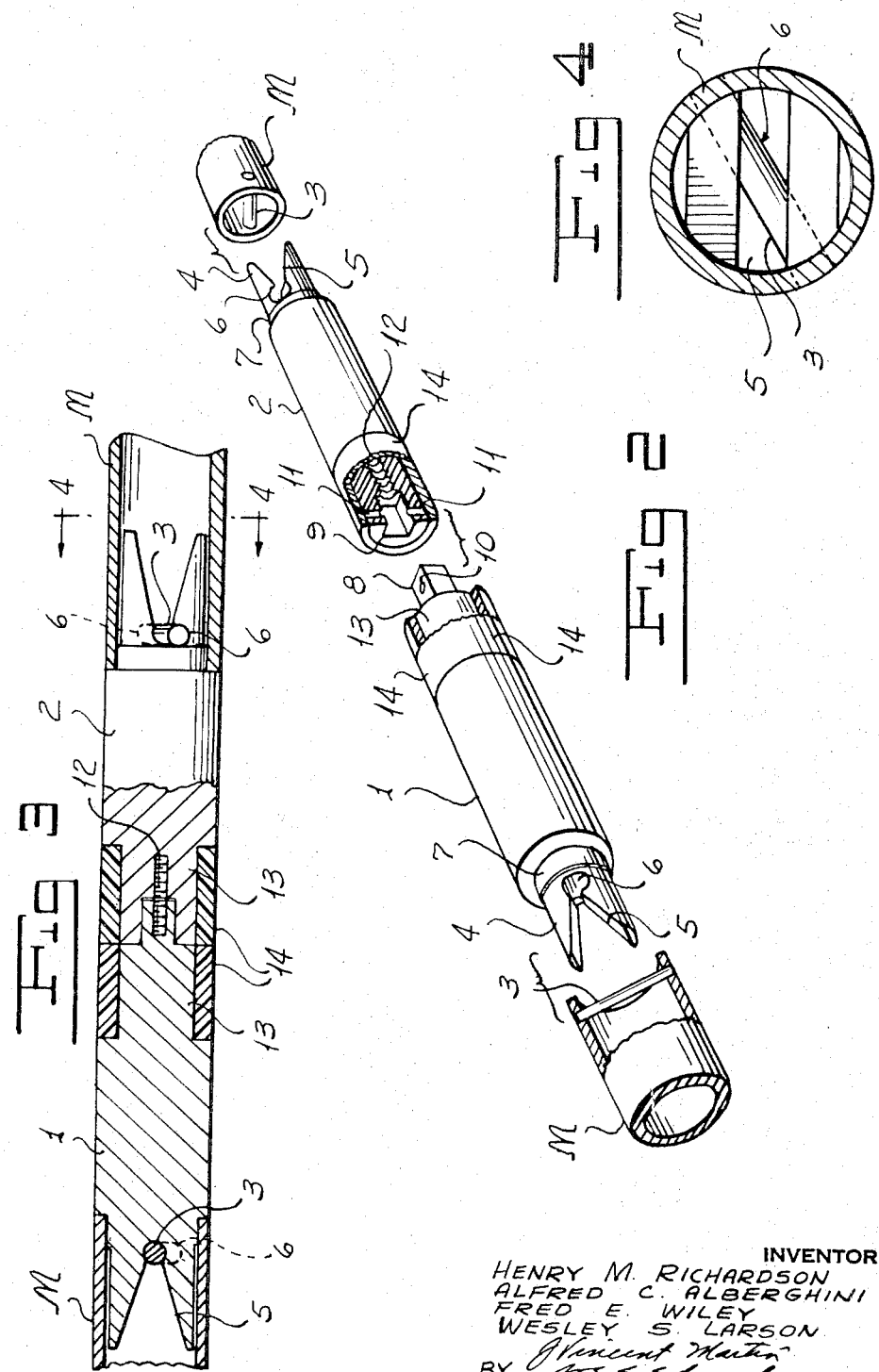

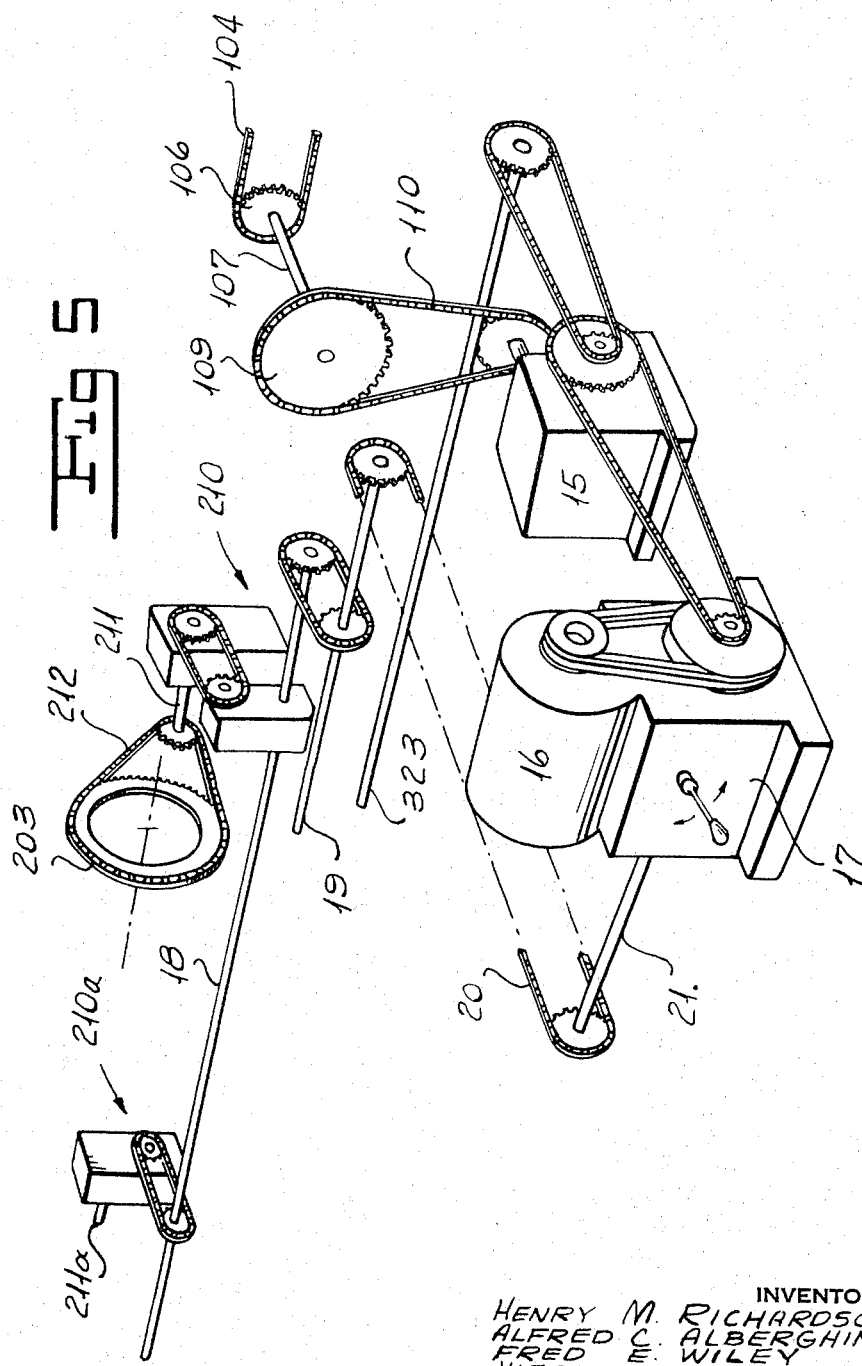

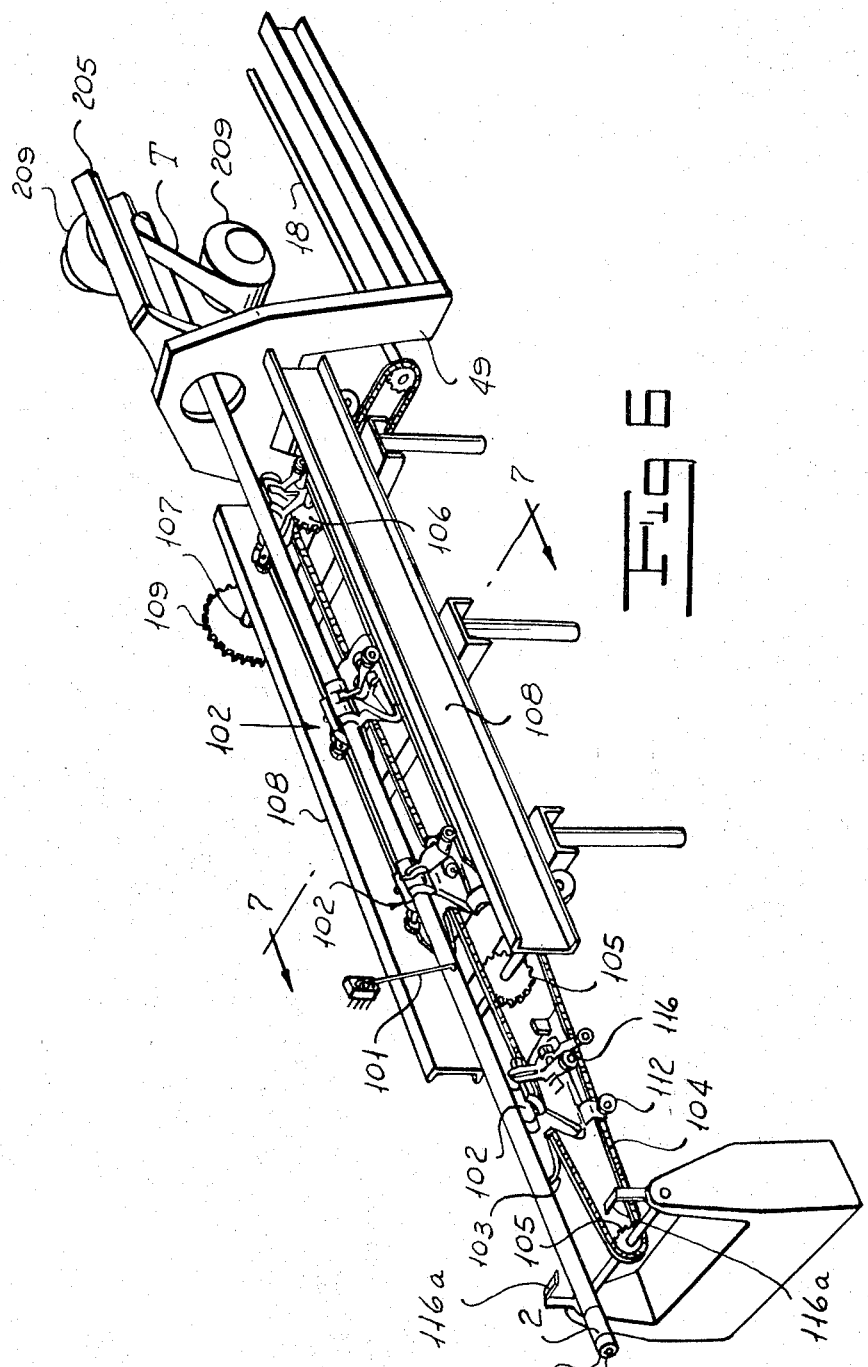

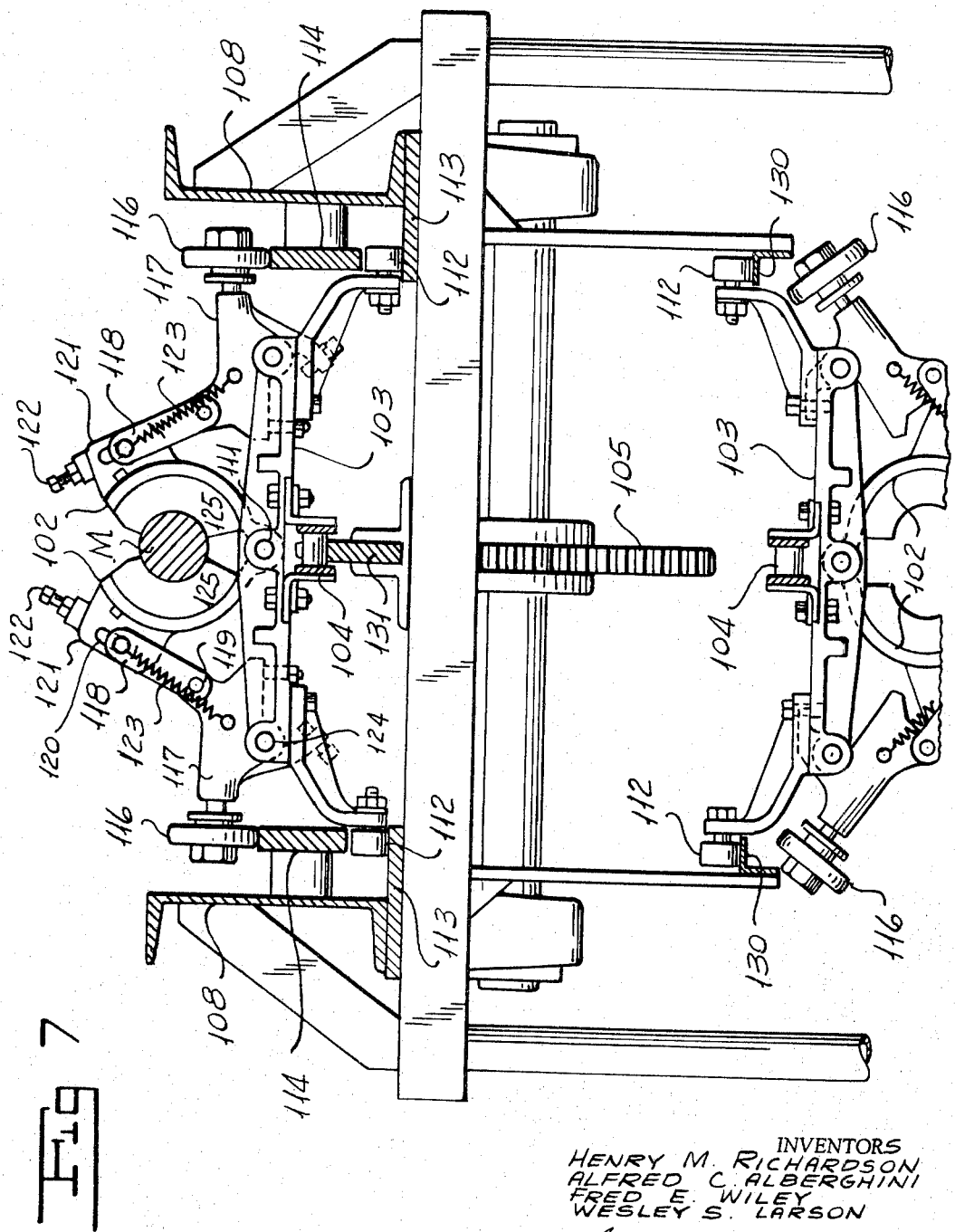

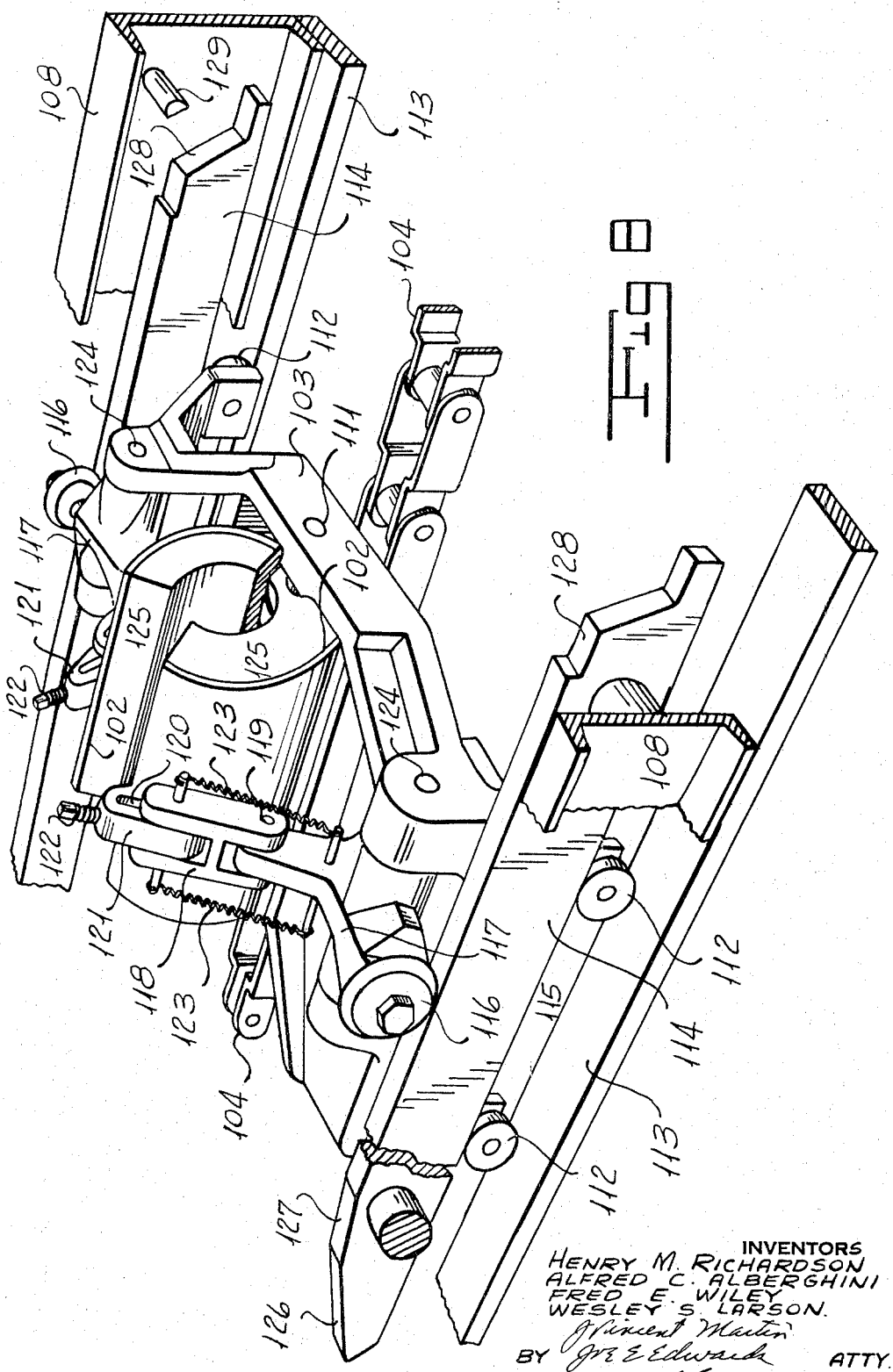

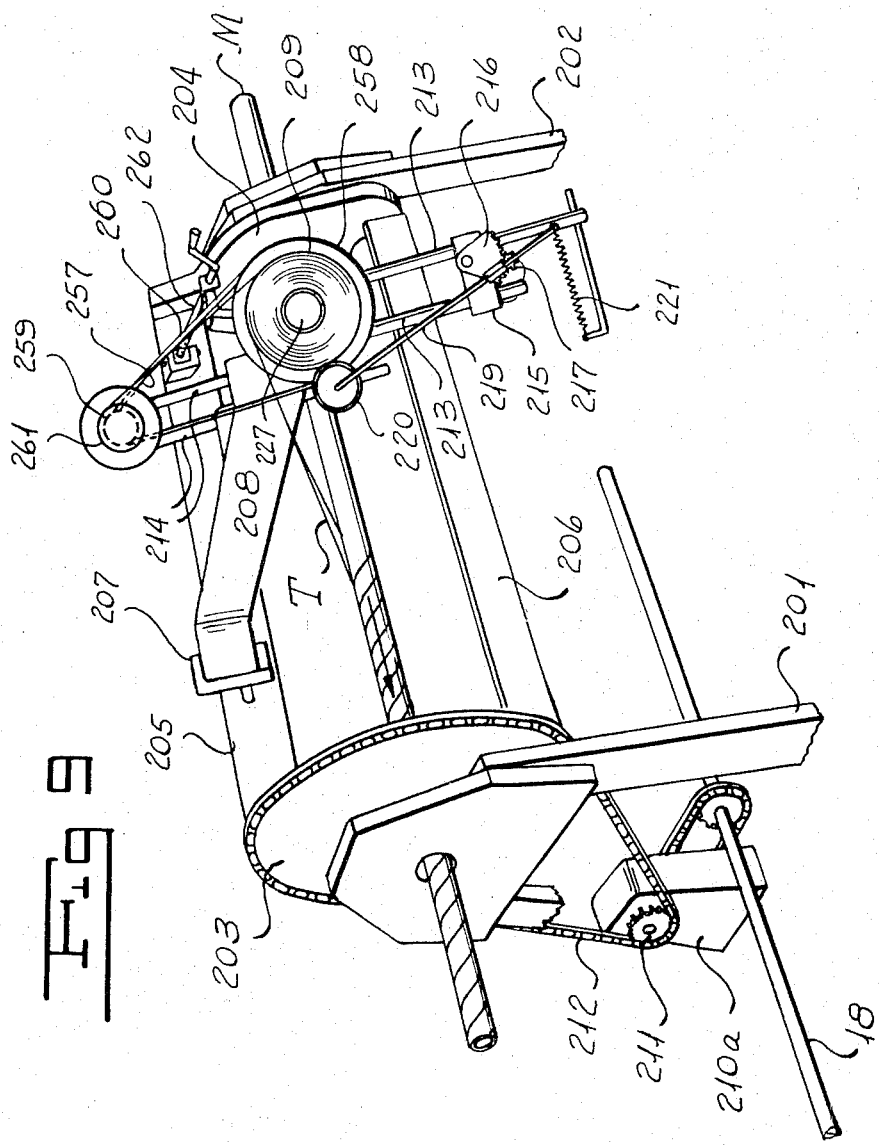

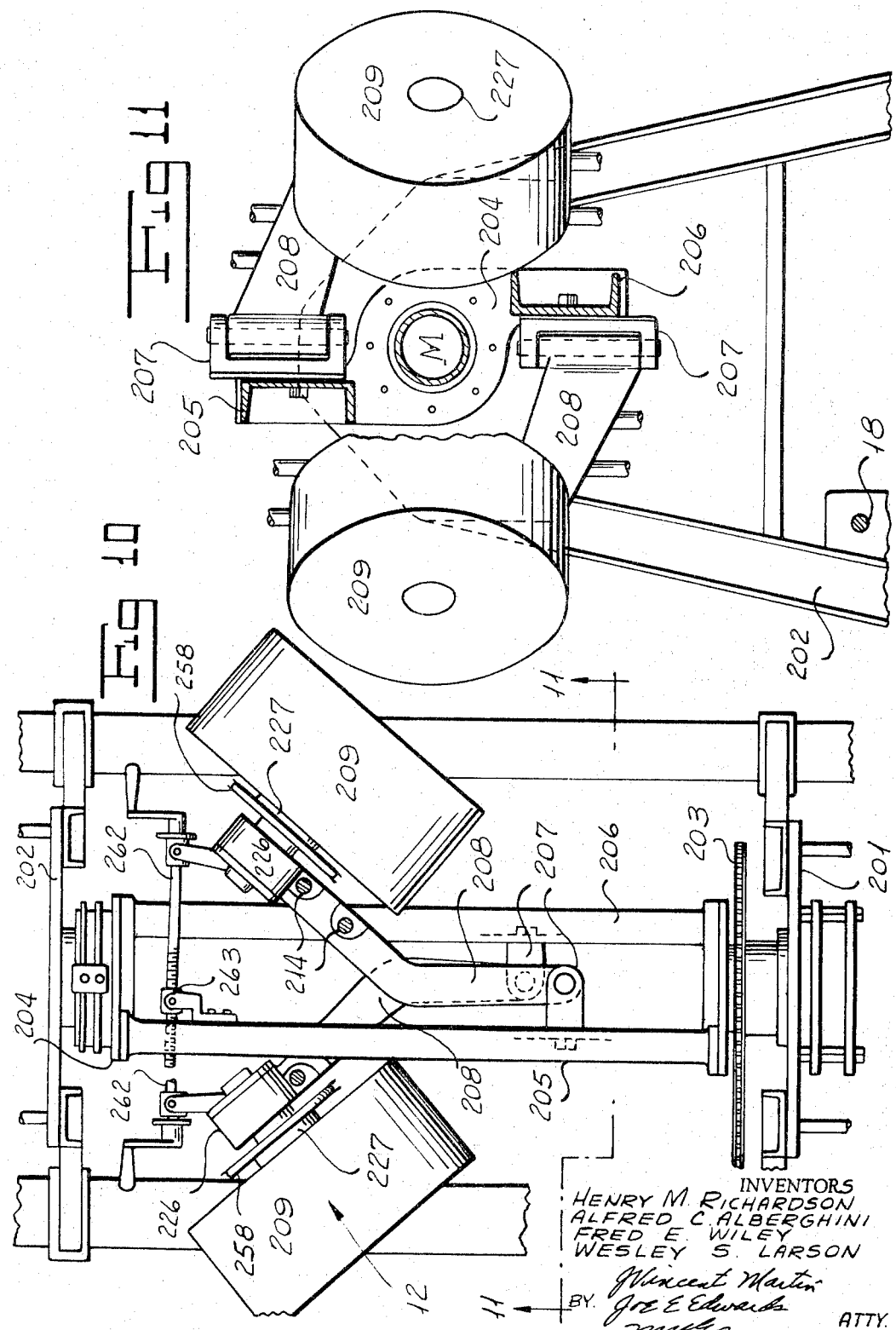

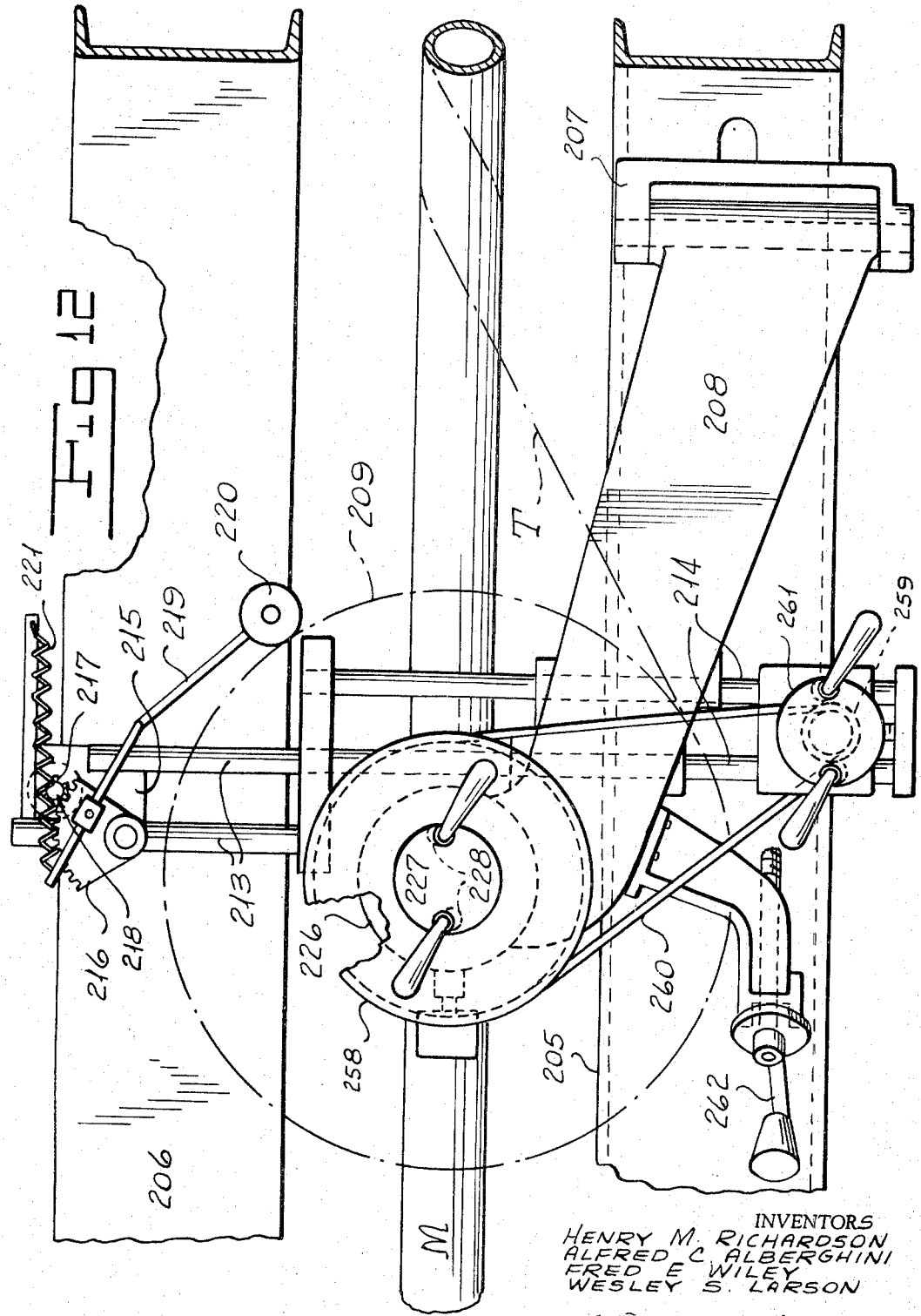

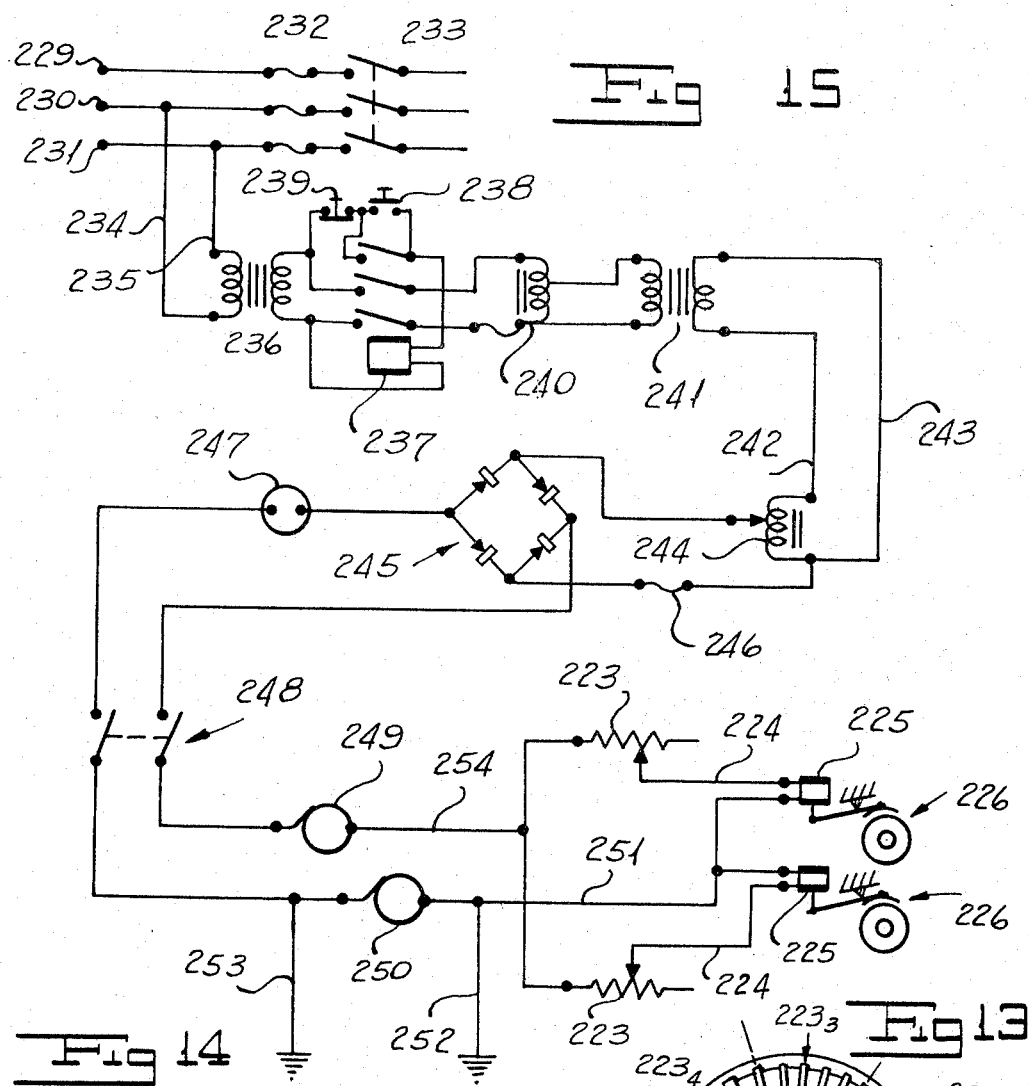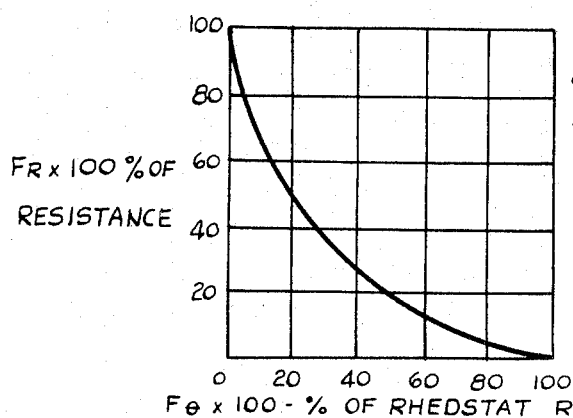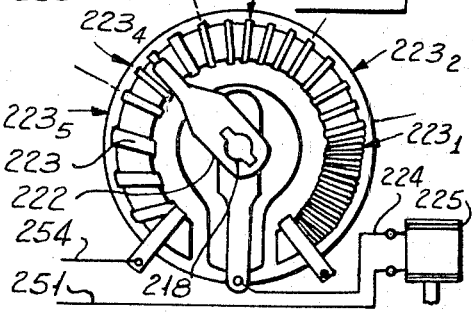

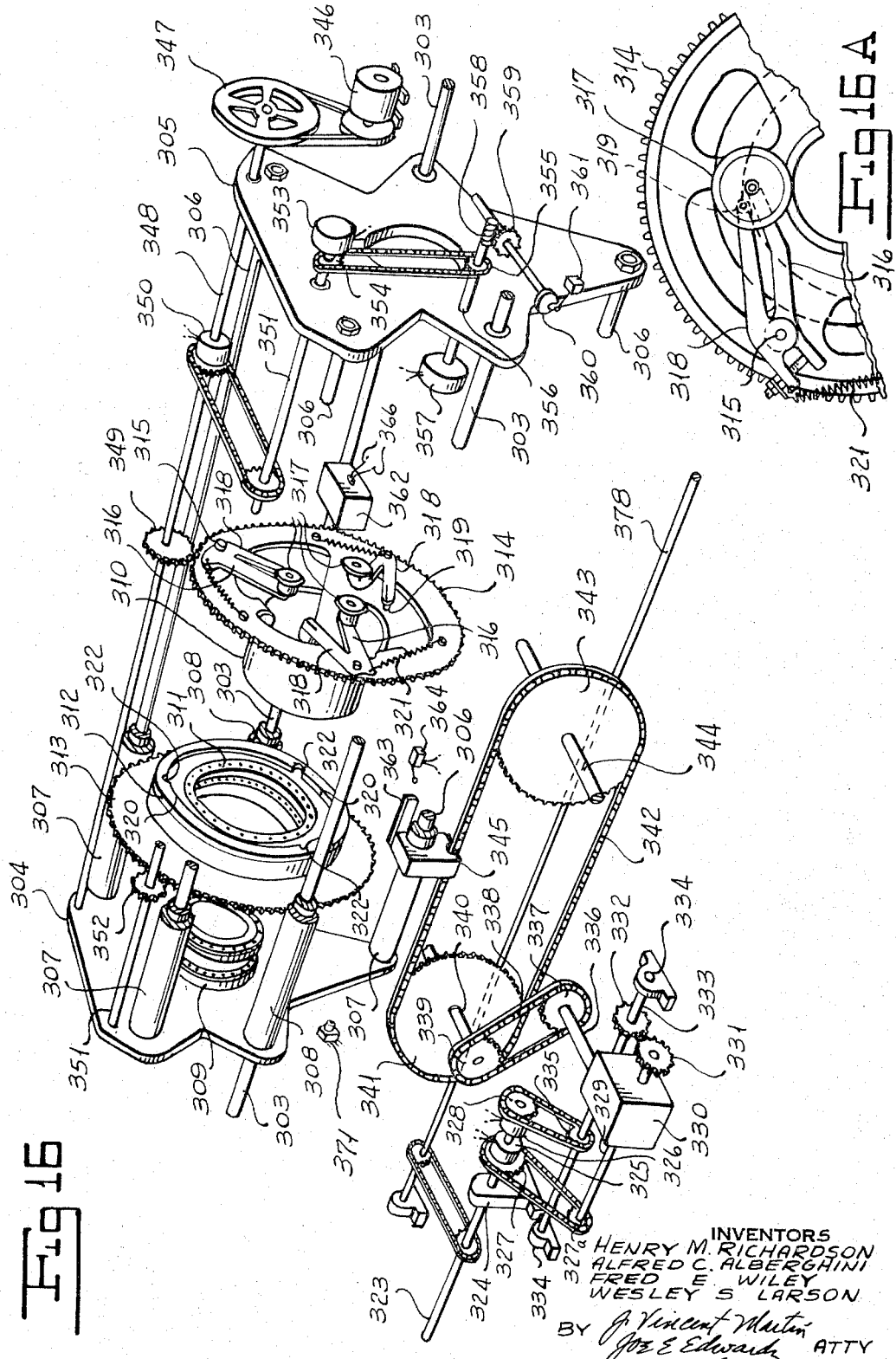

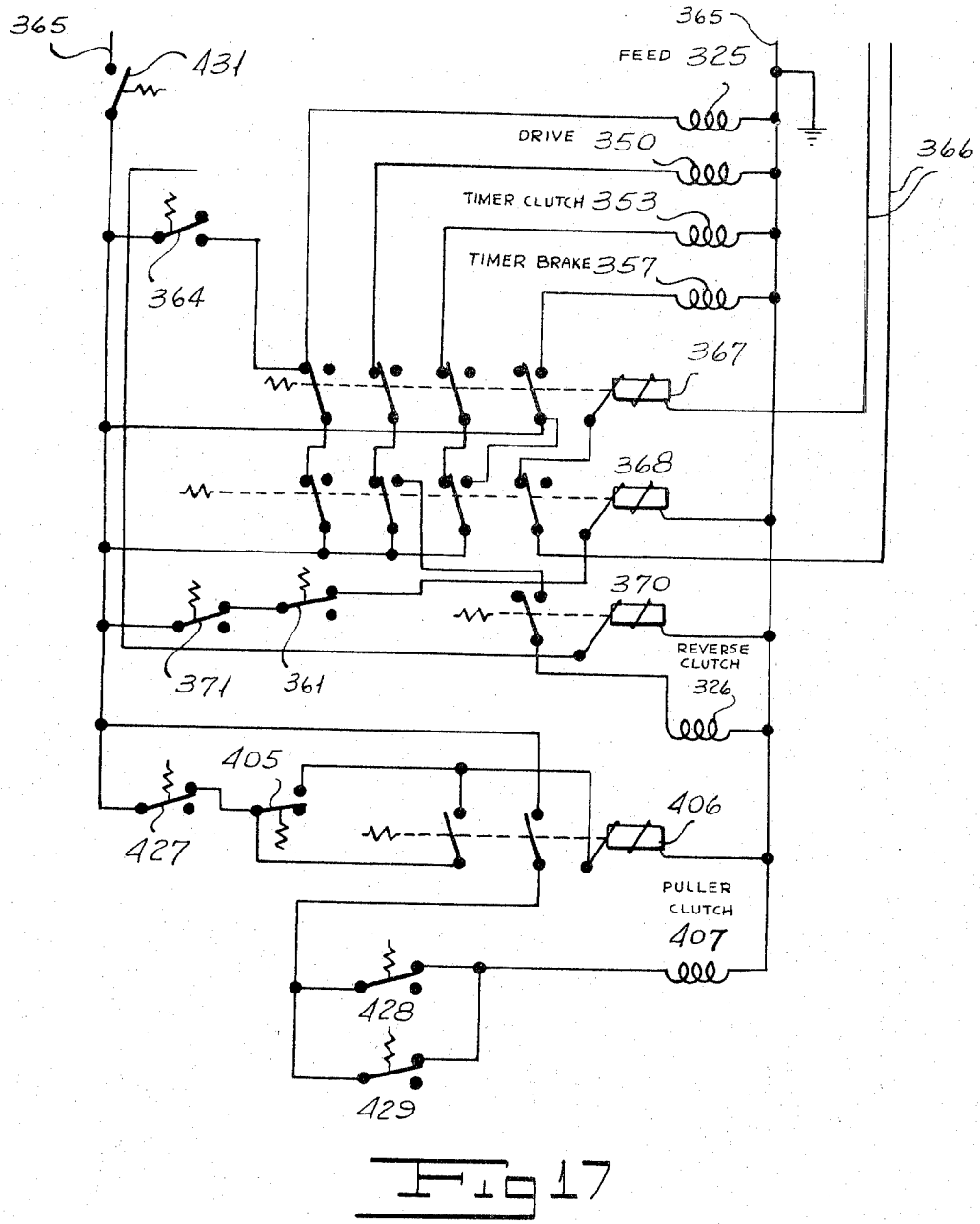

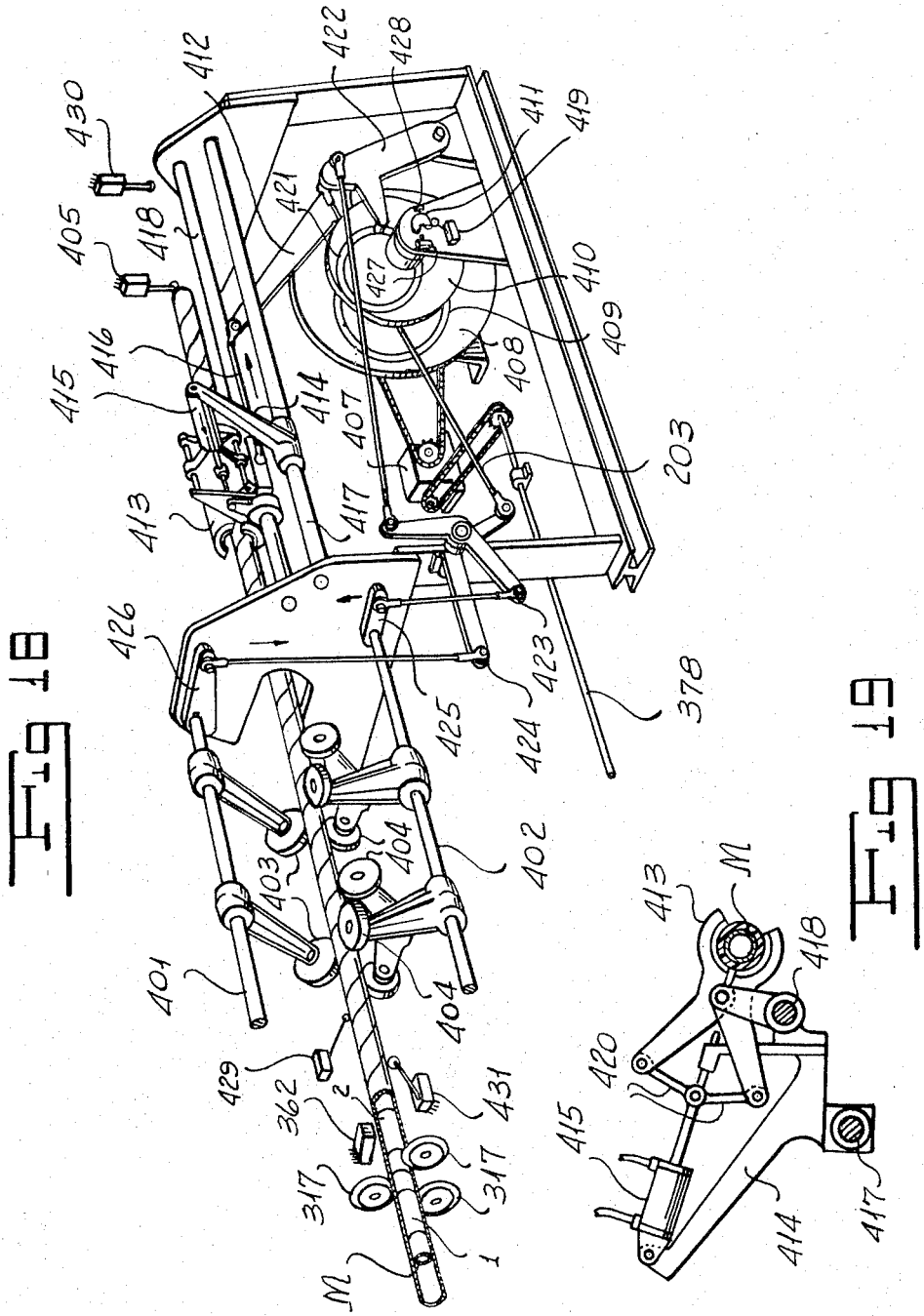

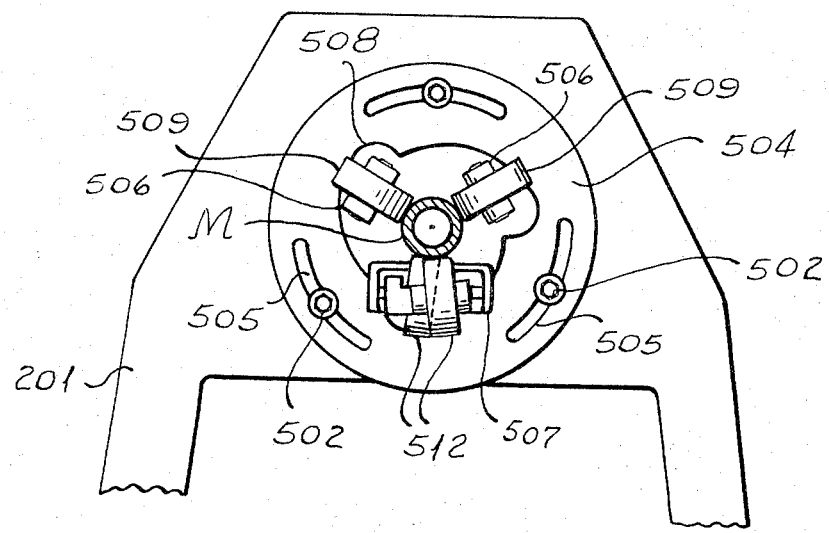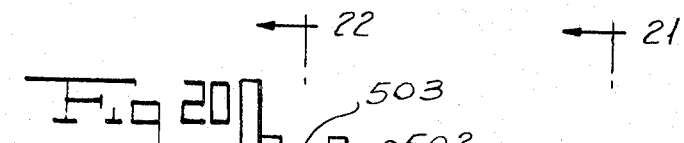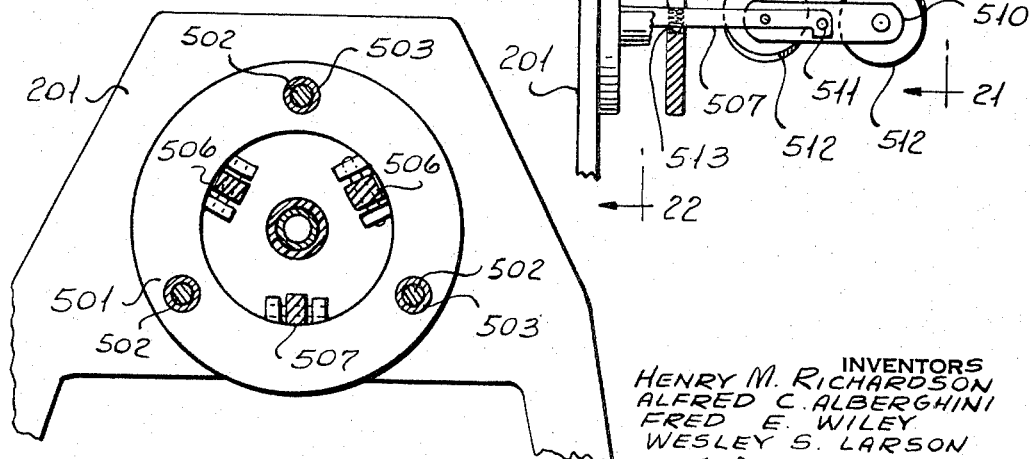

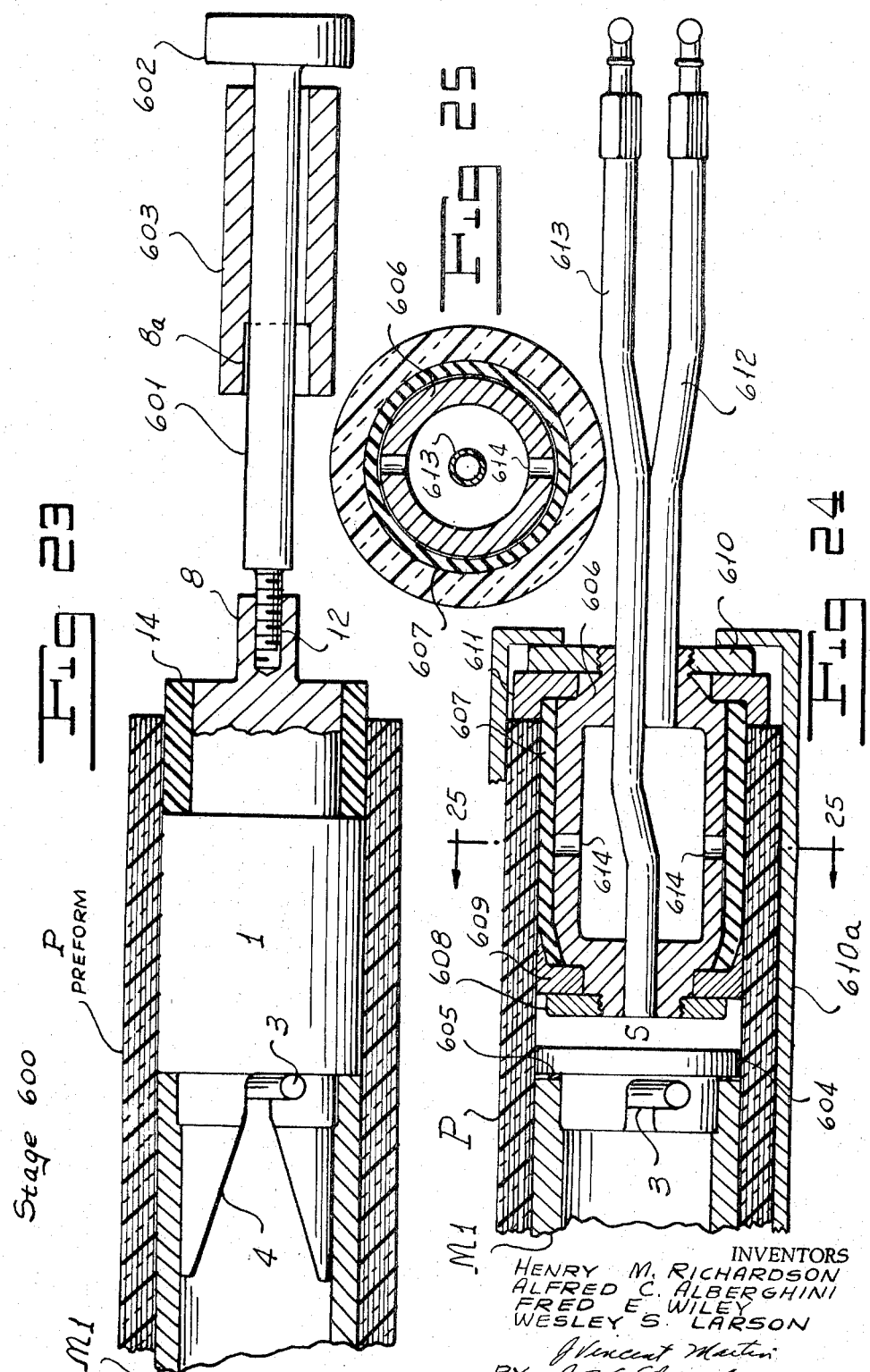

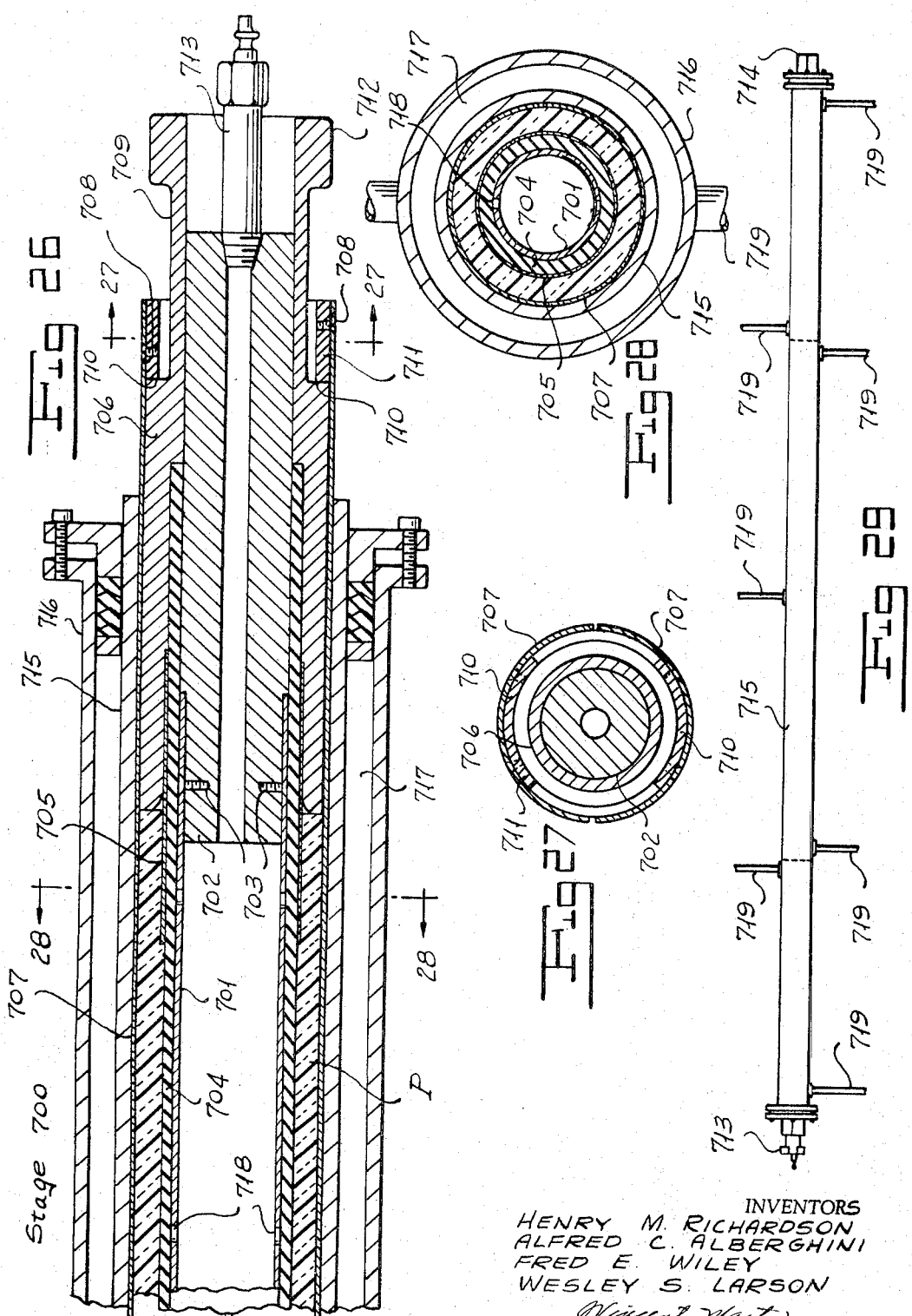

This is a divisional application of our copending application Ser. No. 248,058 filed Dec. 28, 1962, now Patent No. 3,256,128.

This invention is a method and apparatus for making a reinforced hollow plastic article and, while adapted for the fabrication of articles of different kinds and for different uses, is of outstanding utility in the manufacture of pipe formed from wrapped strips and/or tapes of fibrous material in which tapes are incorporated reinforcing glass strands which extend parallel to one another and to the lateral edges of the tapes.

The primary objects of this invention are to produce a non-metallic pipe having an impervious, corrosion-resistant plastic lining encased within resin impregnated fibrous tapes having longitudinal reinforcing strands, with right and left hand wrappings of reinforced tapes under balanced condition and to provide such a pipe by including, in its manufacture, molding and curing steps which stretch or tensilize each layer of the wrappings in turn, so that all of said reinforcing strands are brought to the same degree of tension, with the result that, when internal fluid pressure is applied to the pipe in use, stresses thereon are carried by all reinforcing strands equally.

In carrying out this invention, a mandrel, composed of successive sections, detachably joined end to end, is caused to travel along a predetermined path. As it so travels, there is first applied to the mandrel a helically wound liner. This liner is applied to the mandrel at a first winding station embodying two winding heads arranged to rotate about mandrel and to supply to the latter a liner consisting of two plies of a suitable corrosion-resistant material, such as unplasticized polyvinyl chloride strips helically wound in the same direction with one ply overlying the other and with the edges of each ply abutting one another, in such manner as to break joints with the abutting edges of the underlying layer.

The first ply of the liner applied to the mandrel has been previously coated on the outside, to contact the second ply, with a thin film of a combination of a phenol resin and an acrylonitrile-butadiene synthetic rubber (Buna-N). This layer of adhesive is previously laid down from an ethyl acetate solution. The solvent is then dried and the adhesive left on the polyvinyl chloride strip surface in such condition that it is substantially non-tacky, but will adhere to itself under pressure.

The second layer of liner strip of the same kind, wound on the mandrel, has a coating of vinyl resin polymer adhesive on its surface which engages with the first layer of vinyl strip. The function of the adhesive film is two-fold. Its first function is to act as a pressure sensitive adhesive to hold the two layers of polyvinyl chloride strip in the preform until the latter is subsequently molded, as hereinafter described. Also, during the molding operation, the preform is internally expanded and the adhesive cured and thermoset to form a tenacious bond between the liner layers.

After the liner has been applied to the mandrel as stated, there is next applied over said liner, at successive stations, a plurality of layers or plies of resin impregnated highly absorbent paper, such as Kraft, or asbestos, carrying on its surface parallel laid reinforcing fibers, preferably of glass. This overlay consists of a fibrous web of paper or asbestos fibers in strip form and impregnated with a solution of a curing, thermosetting resin, e.g., phenolic or epoxy resin, combined directly with parallel laid glass fiber strands in the form of a sheet or "beam." In practice this "beam" may consist of from 60 to 120 glass strands per inch of width. The combined strip, comprising the fibrous web with the glass strands laid on it, is then passed through a drying oven and is conditioned to have the proper flow and cure characteristics to produce the end product cured plastic pipe. The reinforced web is then slit to a width such that when it is helically wound on a mandrel with a helix angle, which is determined by the desired distribution of circumferential and longitudinal elongation characteristics of the finished pipe, will wind without overlap and without leaving a gap. Therefore, each individual helical wrap forms a continuous tubular element ply in the wall of the pipe.

The fibrous web to which reference has been made may, if desired, embody asbestos fibers prepared in accordance with the disclosure of U.S. Patent No. 2,626,213 granted to I. J. Novak, used according to said disclosure or in combination with randomly oriented glass or other fibers.

The process of making the pipe from this prepared and slit tape is one of continuous winding on mandrel sections which are successively detachably coupled to one another and fed in continuous succession through the continuous wrapping machine of this invention. The assembled mandrel sections may be of any desired length, e.g. 20 ft., and they may be of any desired diameter. They are successively coupled together end to end and are fed to and through the machine by a pushing or feeding unit which propels them through several winding stations during the wrapping operations to which reference has been made. At these successive stations, progressive winding stands are constituted to alternately feed the glass reinforced tapes in opposite directions or "hand" and automatic mechanism is provided to maintain each of the tapes at all times under uniform tension so that, even in the finished preform, the tension on all of the tapes is uniform and balanced.

After the preform has been completed on any particular section of mandrel, this preform is severed at a mandrel coupling by rotating knives and said preform, with the mandrel section therein, is moved free from the following mandrels and windings and discharged from the machine. The mandrel section container in such preform is then removed from the preform and the latter is subjected to a molding, tensioning and curing operation in the presence of sufficient heat to thoroughly cure the resins therein contained and produce ahomogeneous construction, with the reinforcing glass fibers of the several layers or plies under a tensilized balanced condiiton. Maximum circumferential and longitudinal strength of the pipe results. In such a pipe, the pressure of fluids passing through such pipe will be borne equally by all plies or layers of the pipe.

In addition to the foregoing steps of this process, provision may be made for the coupling together of successive lengths of pipe sections to form a continuous conduit in the field or plant where they are installed for use.

Features of this invention, other than those averted to, will be apparent from the hereinafter detailed description and appended claims, when read in conjunction with the accompanying drawings.

The accompanying drawings illustrate one practical embodiment of the invention, but the construction therein shown is to be understood as illustrative only, and not as defining the limits of the invention.

FIGS. 1 and 1A collectively constitute a pictorial side elevation of apparatus embodying the present invention.

FIG. 2 is an exploded perspective view, partly in section, of coupling elements used to secure in axial alignment successive mandrel sections on which the pipe is formed.

FIG. 3 shows said coupling elements in assembled relation, partly in central section and partly in elevation.

FIG. 4 is a section on the line 4—4 of FIG. 3.

FIG. 5 is a diagrammatic showing of the main drive mechanism of the structure shown in FIGS. 1 and 1A.

FIG. 6 is a perspective view showing the mechanism for advancing assembled successive mandrel sections through the greater portion of the length of the machine.

FIG. 7 is a transverse section on the line 7—7 of FIG. 6, showing means for gripping and feeding the assembled mandrel sections in succession as they pass into and through the machine.

FIG. 8 is a perspective view of the parts shown in FIG. 7.

FIG. 9 is a perspective view of one of the winding stands, the duplication of certain parts thereof being omitted in the interest of clearness.

FIG. 10 is a plan view of one of said winding stands with certain parts omitted.

FIG. 11 is a vertical section on the line 11—11 of FIG. 10.

FIG. 12 is a fragmental elevation looking in the direction of the arrow 12 in FIG. 10.

FIG. 13 illustrates a rheostat employed to control the tension of the tapes as they are wound on the mandrel.

FIG. 14 is a graph illustrating the characteristics of the rheostat of FIG. 13 during the functioning thereof.

FIG. 15 is a wiring diagram of the tape tensioning aspect of this invention.

FIG. 16 is an exploded view of cut-off mechanism whereby successive lengths of the formed pipe are cut from the following portions to produce a preform after a pipe section has been fully wound and while it continues to travel.

FIG. 16A shows one of the cutter and cam arms of the assembly shown in FIG. 16.

FIG. 17 is a wiring diagram for the cut-off mechanism shown in FIG. 16.

FIG. 18 is a fragmental perspective showing mechanism for separating a preformed section of pipe, with mandrel section therein, from the following pipe and mandrel sections after such preformed pipe has been severed by the mechanism shown in FIG. 16. This view also shows mechanism for discharging the preform and the enclosed mandrel section from the machine.

FIG. 19 is a detailed view showing the operation of the pulling jaws shown in FIG. 18.

FIG. 20 is a side elevation of mechanism for supporting and registering the mandrel and partially wrapped pipe thereon with each successive winding stand of the machine as they leave the preceding stand.

FIG. 21 is a section on the line 21—21 of FIG. 20.

FIG. 22 is a section on the line 22—22 of FIG. 20.

FIG. 23 is a longitudinal view, partly in section and partly in elevation, showing the manner of removing a coupling part from one end of a mandrel section.

FIG. 24 is a like view showing the manner of removing a mandrel section from a preformed pipe previously formed thereon, to ready the preform for the final molding and curing operations.

FIG. 25 is a cross section on the line 25—25 of FIG. 24.

FIG. 26 is a longitudinal section of one end portion of the molding and curing elements for the preformed pipe.

FIG. 27 is a cross section on the line 27—27 of FIG. 26.

FIG. 28 is a cross section of the line 28—28 of FIG. 26.

FIG. 29 is a side elevation of the mold as it appears when ready to carry out its functions.

The several successive mechanisms or stages for producing the preformed pipe of this invention are bracketed in FIGS. 1 and 1A of the drawings and respectively designated 100, 200, 300 and 400. They will be hereinafter individually described in this order.

Prior to the feed of the mandrel sections M to the mechanism of Stage 100, they are detachably secured end to end by a novel form of coupling shown in FIGS. 2, 3 and 4. Each of these couplings embodies two parts, namely, a male part 1 and a female part 2. To accommodate this coupling the opposite ends of each of the mandrel sections are interiorly machined to a true cylindrical end portion coaxial with the exterior surface of the section and across the hollow interior of this machined portion extends a pin 3.

The male part 1 is, in the main, cylindrical, but one end has a reduced shank 4 to provide what may be referred to as a clothespin projection having a reentrant mouth 5 at the base of which is formed an angularly disposed hole 6. When this clothespin projection is introduced into the adjacent end of a mandrel section and given a slight rotary turn, the pin 3 will move into the hole 6 and thus lock the male part to that end of the mandrel section after the manner of a bayonet joint, as seen in FIG. 4. In order to insure concentricity between the mandrel and the main portion of the male part, said male part is provided at the base of the clothespin projection with a land 7 of the same external diameter as the machined internal diameter of the mandrel section M. The distant end of the female part 2 is formed with a clothespin projection 4 and hole 6 corresponding to the like portions of the male part and adapted to engage with the pin 3 of its adjacent mandrel section M.

The contiguous ends of the two coupling parts 1 and 2 are respectively provided with a slip connection embodying a lug or tang 8 and a socket 9 to receive said lug in fairly close fitting relation. The lug 8 is shown as square, although it may be of any polygonal cross section. Said lug 8 may, if desired, be provided therein with a hole 10 containing a spring pressed ball detent. The walls of the socket may also be formed with alined holes 11 to detachably receive the ball. The tang and base of the socket both have coaxially tapped holes 12, which are useful as hereinafter described in the withdrawal of the coupling parts from the preform prior to withdrawal of the mandrel.

An important feature of this invention resides in the provision on the coupling of a relatively soft external surface. This is preferably accomplished by reducing the adjacent end portions of the parts 1 and 2 as shown at 13 and fitting tightly upon these reduced portions sleeves 14 of some relatively soft material against which cutting rolls may act in cutting a completed preform from the preceding windings after each preform has been completed.

As hereinafter described, this cutting of the preform is initiated by a sensing device (e.g. Westinghouse Proximity Limit Switch), the operation of which is controlled by the effect of different materials upon an inductive field. In order to so function, such a difference is dependent upon the passage of a magnetic or non-magnetic part in proximity to the sensing device. If the mandrel sections have magnetic characteristics, the parts 1 and 2 of the coupling have non-magnetic characteristics and the sleeves 14 must also have non-magnetic characteristics. In practice it is preferred to make the mandrel of steel, the main parts of the coupling of aluminum, and the sleeves 14 of a non-mangetic resin, such, for example, as polyethylene. With this relation between the parts, the sensing device is so constituted that it will react when the couplings pass in approximately thereto to actuate the severing mechanism as hereinafter described in detail.

As the mandrel sections are successively coupled together as stated, they are fed as a complete mandrel to the machine shown in FIGS. 1 and 1A. It is essential that the sections be close coupled for, if any tang 8 is not fully seated in its cooperating socket 9, a void will be left between the contiguous ends of the parts of that coupling. This would cause difficulty during the passage of the mandrel through the machine. Consequently a feeler finger 101 (FIGS. 1 and 6) is positioned to bear against the mandrel as it is fed. If this finger feels any void in the mandrel, it operates a switch to stop the machine.

Stage 100 (FIGS. 6, 7 and 8)

The function of this stage is to grip the mandrel fed thereto and push it through the stages of the machine up to the point where a finished preform is cut from the following windings. To accomplish this function, there is provided in this stage a series of mandrel engaging clamps 102.

Each of these clamps 102 is mounted on a carrier 103 which is in turn secured to an endless chain 104. This chain passes around directional sprockets 105 and is driven by a drive sprocket 106 which is supported on a shaft 107 journalled in side rails 108 of this unit of the machine. The sprocket shaft 107 is driven through a sprocket 109 and chain connection 110 (FIG. 5) from a right angle gear reducer 15 which is in turn driven from a gear box 17, belt driven from the adjustable speed motor 16 which constitutes the prime mover for the machine.

Each clamp 102 embodies two arcuate clamping jaws mounted for opening and closing movement on a pin 111 (FIGS. 7 and 8) which supports the jaws on its carrier 103. The opposite sides of the carrier extend downwardly and mount guide wheels 112 (FIG. 7) which ride on lower tracks 113 carried by the side rails 108. Above these lower tracks 113 are upper tracks 114, the lower edges of which form with the lower tracks 113 longitudinal runways 115 (FIG. 8) in which the wheels 112 travel to keep the clamp from tilting, whereby the clamps 102, when closed, travel coaxially with the mandrel.

Mounted to travel on each of the upper guides 114 is a wheel 116, which is mounted upon one end of a toggle arm 117, the other end of which is secured to a toggle link 118 by a pivot pin 119. The distant end of each toggle link is pivotally secured in a slot 120 to a lug 121 rigid with one jaw of the clamp. An adjusting screw 122 acts upon the upper pivot pin of the toggle link 118 to adjust the throw of the toggle and the pressure exerted by the jaws on the mandrel. Springs 123 normally "break" the toggle from the stressed position which it assumes when the corresponding jaw of the clamp is in closed position. The toggle arrangement described is duplicated on both sides of the carrier, the toggle arm 117 in each case being supported on a pivot pin 124. When the toggles are in the stressed position shown in FIG. 7, the jaws are firmly closed upon the mandrel at the point where the latter passes through each clamp.

In order to insure a firm grip upon the mandrel and insure positive pushing action by the several clamps, the jaws of each clamp are preferably provided with a cast iron liner 125. With the gripping action produced by such a liner, there is no slippage between the several clamps and the mandrel. In practice, the inner radius of each jaw is slightly different than the outer radius of the mandrel so that deflections resulting from the toggle action will assure accurate mating friction surfaces between said jaws and the mandrel.

The operation of the machine of this invention has demonstrated that special means must be provided for bringing the clamps in succession into cooperation with the mandrel, otherwise there is a probability that the clamp sections, when brought into position to engage the mandrel, will strike the same and throw the mandrel out of line. This will cause trouble in the subsequent operations of the machine. This difficulty has been overcome by the particular formation of the wheel supporting surfaces of the lower and upper tracks 113 and 114. The lower track may be flat throughout so that, as the chain advances each clamp carrier 103, the wheels 112 of such carrier will first be raised to the level of track 113 and proceed to travel along the same.

It is essential as a protective measure against damage to the parts that the clamps be fully opened as they approach engagement with the mandrel. In order to insure this, there is mounted at the forward end of the machine camming members 116a (FIG. 6) so placed that, as the carrier 103 passes from the lower path of its travel to the upper path thereof, these camming members 116a will lie in the path of the toggle wheels 116 of any clamp which may be closed at that time. The engagement of the wheels 116 with these camming members 116a will open such a clamp and prepare it to properly cooperate with the mandrel.

Moreover, the clamp on each carrier must not be closed until the mandrel has entered the confines of the clamp. To insure this, the left hand or leading end of each upper track has (FIG. 8) an abrupt sloping portion 126 merging into a portion 127 of less slope which, in turn, merges into the flat surface of the upper track 114.

Simultaneously with these operations, the toggles, which approach the tracks 114 in broken, i.e. open position, first engage their wheels 116 with the abrupt inclination 126 of the upper track to partially close the gripping jaws, while the less sloping portion 127 of the upper track completes the closing of the jaws as the axis of the clamp comes into substantial registration with the axis of the mandrel. Meanwhile the upper reach of chain 104 is supported on slide 131 (FIG. 7). Experience with this construction has shown it to be thoroughly reliable for it insures proper gripping of the mandrel without any tendency to throw the latter out of line.

As the toggle wheels 116 ride up over the inclined portions 126 and 127 in succession, they will move the toggle arms in directions to close the clamping jaws upon the mandrel and these jaws will be finally closed by the time these toggle wheels 116 arrive at the flat horizontal portions of the upper surfaces of the upper tracks 114.

This relation between the parts persists while each clamp travels along said upper horizontal surface of the upper track 114, to push the mandrel forwardly until the toggle wheels 116 come to the opposite ends of both tracks. These opposite ends are shown in FIG. 8. Each upper track is there stepped down, as shown at 128, and into these stepped-down portions, the wheels descend, assisted in such descent by knock-down pins 129. The descent of these wheels is sufficient to throw the toggles over dead centers, i.e., "break" the toggles, at which time the springs 123 will cause the toggles to be fully broken to open the jaws of the associated clamp.

By continued movement of the carrier, the wheels 116 will leave the tracks, to be carried by the chain 104 in a retrograde direction at a lower level to the point of starting. During this return movement, the wheels 112 will be guided to starting position by lower guides 130 (FIG. 7) which will preclude undue sagging of the chain. Also during return movement, the springs 123 will hold the toggles in broken condition and the clamps open until the operations described with respect to engagement of the clamps with the mandrel are repeated.

Stage 200 (FIGS. 9–15)

As the mandrel is pushed along a rectilinear path by the clamps 102, it passes through a plurality of winding stands which may be of any desired number, depending upon the wall thickness and consequent strength of the desired end product pipe. During its passage through the first stand, there is applied to the mandrel a pipe liner, comprising at least one ply of, e.g., unplasticized polyvinyl chloride. As it passes through succeeding winding stands, there is applied over this pipe liner successive layers or plies of the preferably glass fiber reinforcing tapes of the character hereinbefore described.

FIGS. 9–12 of the drawings show one of these stands, the others being of identical form except that the several consecutive stands are so constituted as to wrap the glass reinforced tape in alternate directions or "hands," i.e., with right and left hand helices, respectively. In the stands which wrap the glass reinforced tapes, provision is made for the taking up of an interleaf of any suitable character which is positioned between the successive convolutions of the coiled strips of such tapes. The purpose of this interleaf is to preclude successive convolutions of the tape from sticking to one another in such manner as to interfere with the proper feed of the tape to the mandrel. In the stand which feeds the unplasticized polyvinyl chloride strips, an interliner is also used where these strips have an adhesive backing.

As shown generally in FIG. 9, each stand comprises a pair of spaced apart upright frames 201 and 202. Journalled for rotation in bearings on the frame 201 is a sprocket 203 and similarly journalled for rotation at the inner side of the frame 202 is a plate 204. The sprocket and plate are rigidly secured in spaced relation by spacer bars 205 and 206 which, together with the sprocket and plate, form a rotatable winding head.

Mounted on one side of the spacer bar 205 is a pivot block 207 carrying a pivoted arm 208 which serves as a support for a roll 209 of liner strip or reinforced glass tape T, as the case may be. It is from this coil that the liner strip or tape is fed to the mandrel as the winding head rotates about the latter in such a manner as to lay the strip or tape on the mandrel in a helical path with the strip or tape from that particular roll in edge abutting relation to form one layer or ply thereof on the mandrel. The pivot block 207 is mounted for adjustment longitudinally on the bar 205 so as to obtain proper correlation of the edge abutting joints of the successive layers of strips and tapes.

The several winding heads are all driven from a winder shaft 18 (FIGS. 5 and 9) having a chain drive from main drive shaft 19 which has a chain drive connection 20 with shaft 21 driven from the gear box 16. Shaft 18 drives a plurality of variable speed and directional units 210, so that their output spindles 211 rotate in one direction, and also drives interspaced variable speed units 210a, so that their output spindles 211 and 211a rotate in the opposite direction. The output spindles of each of these units have a chain drive connection 212 (FIGS. 5 and 9) with the gear 203 of one of the winding heads, whereby the several heads are successively rotated in opposite directions. The speed and direction of rotation of the winding heads of the several stands is controlled through these conections, so that the winding may take place at the desired speed and in right or left hand windings, as is required for the respective stands.

In FIG. 9 only one arm 208 and tape roll are shown as adapted to apply one layer or ply of the strip to the mandrel. However, FIGS. 10 and 11 show that the same identical structure is applied to the opposite face of the bar 206, so that two layers of liner strip or tape will be applied at each stand with these two layers overlapping one another one-half the width of the previous strip or tape thus fed. The edge joints between each second layer or ply will thus overlie substantially the medial line of the underlying ply or layer.

In accordance with the present invention, the several strips of the liner and reinforced tape are fed under predetermined uniform tension. In order to accomplish this, due provision must be made for the decrease in the diameter of the rolls as the strips and tapes are fed from said rolls. The means for accomplishing this result will next be described.

Rigidly supported on each arm 208 are a pair of parallel rods 213 extending in one direction, while another pair of parallel rods 214 extend in the opposite direction from said arms (FIGS. 9 and 12). Fixed on the rods 213 is a supporting block 215 and on this block is pivoted a toothed quadrant 216. The teeth of this quadrant mesh with a pinion 217 secured to the spindle 218 of a rheostat shown in FIG. 13.

Rigid with the quadrant 216 is a rod 219 which carries at its far end a follower roller 220 biased by a spring 221 to at all times engage with each of the strip and tape rolls 209. Fixed to the spindle 218 of the rheostat is an arm 222 mounted to travel over a variable resistance element 223 in the form of an arcuately disposed coil. This coil is wound spirally around an insulating toroid or ring with one end connected to a conductor 224. This conductor leads to a magnet 225 which acts upon a friction brake 226 (FIG. 10) associated with the spindle 227 on which a roll 209 is mounted and locked against rotation thereon by handle-operated eccentrics 228 (FIG. 12). By varying the current flowing through the friction brake, which may be any appropriate conventional form, the amount of friction applied to the spindle of the roll 209 is controlled to place the desired tension on the strip or tape T fed to the mandrel.

The wiring diagram of FIG. 15 shows very clearly how the parts described are electrically connected and controlled to accomplish a uniform tension on the respective strip or tape coils of each winding head as the strip or tape is fed therefrom to the mandrel.

According to this diagram (FIG. 15), 550-volt, 3-phase, 60-cycle alternating current power is supplied to the entire machine through conductors 229, 230 and 231. Fuses 232 give overload protection, and 3-pole switch 233 is provided to disconnect power from the main drive motor 16 on the machine. Conductors 234 and 235 receive 550-volt, 60-cycle, single-phase power from one phase of the 550-volt, 60-cycle, 3-phase power which is supplied to the machine. Transformer 236 reduces this single-phase, 550-volt power to 120 volts, single phase. Relay 237 is provided with a start button 238 and a stop button 239 so that this 120-volt, single-phase power may be supplied to autotransformer 240 or may be disconnected from this autotransformer should occasion require. Autotransformer 240 is used to adjust the tension on the entire machine for starting and operating levels. It also supplies an alternating voltage adjustable from 0 to 140 volts to transformer 241, which further reduces the adjustable alternating voltage from 0 to 140 volts to 0 to 34 volts. Conductors 242 and 243 carry this adjustable alternating voltage of 0 to 34 volts to autotransformer 244. This autotransformer is provided to adjust the tensions at each individual winding head and may be adjusted to supply 0 to 100% of the 0 to 34 alternating voltage of transformer 241 to bridge rectifier 245 through protective fuse 246. Bridge rectifier 245 converts this adjustable alternating voltage to direct current voltage adjustable between 0 and 24 volts. The direct current is supplied through ammeter 247 and disconnect switch 248 to slip rings 249 and 250. Conductor 251 is connected to the rotatable winding head at 252 of the machine and is grounded as shown at 253 through slip ring 250 to avoid ground current flow through the rotatable frame support bearings. Conductor 254 carries the adjustable direct current voltage to rheostat coils 223 shown in FIG. 13 and connections 224 pass such voltage to the magnets 225 of the magnetic brakes 226 of the two winding heads of that particular stand.

The magnetic brakes 226 supply a frictional torque to resist the action of the winding mechanisms in pulling the tape off the tape rolls 209 (FIGS. 10, 11 and 12) which are held rigidly to the spindles 227 of the magnetic brakes 226. Conductors 242 and 243 also supply the adjustable AC voltage by parallel connections to each winding head of the machine. The aforesaid elements 244 through 252, inclusive, are duplicated on each winder head. Rheostat 223 (FIG. 15) maintains a constant tension on both tapes as they are being wound regardless of the size of the coil of tape which is rigidly attached to the spindles 227 of the magnetic brake 226.

The desired tape tension at each winding head is obtained by adjusting each autotransformer 244 to provide the required amount of electric current flowing through the magnetic brake coils 225, since the amount of resisting torque developed by a magnetic brake is proportional to the amount of electric current flowing through the magnetic brake coil.

As hereinbefore stated, as winding proceeds, the diameter of each tape coil is reduced and an increase in tape tension is required to overcome a constant resisting torque on each magnetic brake. In order to maintain this constant tape tension during winding, it is necessary to reduce the resisting brake torque in proportion to the decrease in tape coil diameter. Thus, for constant tension winding, there must be a variable resisting torque which is always maintained proportional to the coil of tape diameter. Each winding head autotransformer 244 is adjusted to produce the resisting torque necessary to give the desired tape tension with a full roll of tape. To effect automatic operation, the electric current flowing through magnetic brake coil 225 and conductors 254 and 251 is continuously adjusted to a fraction of its maximum value, which fraction always equals the ratio of the tape coil diameter to the maximum or full tape roll diameter. Since magnetic brake coil 225 has a fixed value of resistance, added resistance is introduced into the circuit by means of the rheostat, illustrated in FIG. 13, to reduce the electric current flowing through magnetic brake coil 225 to the value required to develop the correct fraction of resisting torque.

The aforesaid constant tension results because the ratio of minimum coil of tape diameter to maximum coil of tape diameter is equal to the ratio of minimum resisting torque to maximum resisting torque which is the result of an equal ratio of the minimum electrical current flowing through magnetic brake coil to the maximum electrical current through said coil, which equal ratio may be obtained when the appropriate coil portions $223_1$ through $223_5$ of the electrical resistance element 223 of the rheostat shown in FIG. 13 is selected so that the ratio of the electrical resistance of magnetic brake coil 225 to the combined electrical resistance of rheostat element 223 and magnetic brake coil 225 is also equal to the ratio of minimum coil of tape diameter to maximum coil of tape diameter.

For example, with a minimum coil of tape diameter of 4.625 inches and a full coil of tape diameter of 20 inches, a magnetic brake coil of 22 ohms electrical resistance will require a rheostat resistance element of 73.2 ohms to develop equal tape tension at the maximum and minimum coil of tape diameters as shown by Formulae 1 and 2:

$$\frac{R_B}{R_R+R_B}=\frac{D_1}{D_2} \quad (1)$$

$$R_R=R_B\left[\frac{D_2-D_1}{D_1}\right] \quad (2)$$

$$R_R=22\left[\frac{20-4.625}{4.625}\right]=73.2 \text{ ohms}$$

$D_1$=Min. coil of tape dia., in.
$D_2$=Max. coil of tape dia., in.
$R_B$=Resistance of magnetic brake coil, ohms.
$R_R$=Resistance of rheostat element, ohms.

It is seen by Formula 2 that, if $D_1$ were zero, an infinite rheostat resistance would be required. As tape is wound on cores to be placed on brake spindle 30, $D_1$ is never zero and, practically, Formula 2 can always be used to select the proper size rheostat.

In FIGURES 12 and 13, as coil of tape diameter changes from $D_2$ to $D_1$ the rheostat shaft 218 is rotated from its 100% position to its 0% position and, at any intermediate diameter D, the percent rotation of shaft 218 is equal to the percent of remaining coil diameter as given in Formula 3:

$$F_D=\frac{D-D_1}{D_2-D_1} \quad (3)$$

$F_D \times 100$=Percent of rheostat shaft rotation
$D$=Coil of tape diameter, inc.

As shown by Formula 3, rheostat shaft rotation is a direct linear function of Diameter D. Although the empty and full coil of tape positions develop constant tape tensions when rheostat resistance element 223 is selected in accordance with Formula 2, it does not follow that constant tension will result at an intermediate diameter D.

The requirement for constant tension is met when the magnetic brake current is always in proportion to the coil of tape diameter D which in turn is met when the reciprocal of the total rheostat and brake coil resistance is always in proportion to the coil of tape diameter D.

$$R_D=F_R R_R \quad (4)$$

$$\frac{1}{F_R R_R+R_B}=KD \quad (5)$$

$R_D$=Resistance of rheostat in coil circuit at dia. D ohms.
$K$=Proportional constant
$F_R \times 100$=Percent of full rheostat resistance in coil circuit at dia. D.

then from 3:

$$F_D=\frac{\dfrac{1}{F_R R_R+R_B}-\dfrac{1}{R_R+R_B}}{\dfrac{1}{R_B}-\dfrac{1}{R_R+R_B}} \quad (6)$$

This Equation 6 can be solved for:

$$F_R=\frac{(1-F_D)}{\left[1+\dfrac{R_R}{R_B}F_D\right]} \quad (7)$$

and with Equation 2 yields:

$$F_R=\frac{(1-F_D)}{\left[1+\dfrac{(D_2-D_1)}{D_1}F_D\right]} \quad (8)$$

By means of Equation 8, the relation necessary for constant tension of rheostat shaft 218 rotation $F_D$ to the proportion of rheostat resistance $F_R$ introduced into the coil circuit, can be obtained for any values of empty and full coil of tape diameters. For example, with
$D_1$=4.625 inches
$D_2$=20 inches $$F_R=\frac{(1-F_D)}{(1+3.32F_D)} \quad (9)$$

Equation 9 is plotted in FIG. 14 and shows the proportion of resistance required at each setting of rotation of shaft 218. It is seen that 52% of the resistance is removed by the first 20% of shaft rotation but ony 5.5% of the resistance is removed by the last 20% of shaft rotation. Although the rheostat resistance element 223 may be wound on the insulating ring with a decreasing helical pitch, as indicated in FIG. 13, it is usually more expedient to divide the resistance element into about 5 coils of uniform pitch with each coil having a different wire size and resistance. For example, with the 22 ohm brake, the 73.2 ohm rheostat of FIG. 13 would be made up as show nin the table below.

| Rheostat Coil Portion No. | Percent of Resistance | Resistance, ohms |
|---|---|---|
| $223_1$ | 52.0 | 38.1 |
| $223_2$ | 22.3 | 16.3 |
| $223_3$ | 12.4 | 9.1 |
| $223_4$ | 7.8 | 5.7 |
| $223_5$ | 5.5 | 4.0 |
| Total | 100.00 | 73.2 |

The curve of FIG. 14 is dependent only on the maximum and minimum tape roll diameters over which constant tension operation is desired and total rheostat resistance is dependent on these diameters and the coil resistance of the magnetic brake. The constant value of the operating tension is determined by the voltage applied to the system by the autotransformers.

FIG. 9 shows the mechanism for removing an interleaf 257 from the strip roll as the liner strip or glass reinforced tape is passed to the mandrel. Mounted on the spindle 227 (FIGS. 9 and 10) of the magnetic brake 226 is a pulley 258 which drives another pulley 259 (FIG. 12) through a belt 260. The pulley 259 is supported on rods 214 and rigid with the pulley 259 is a take-up roll 261 for the interleaf.

With this arrangement the interleaf is wound upon the take-up roll 261 as the glass reinforcing tape T is wound on the mandrel.

The pitch of the helix at which each strip is applied to the mandrel is controlled by an adjustment on each winding head. As shown in FIGS. 10 and 12, this may consist in an adjusting rod 262 rotatable in a sleeve carried by each of the arms 208 and threaded through a nut 263 carried by the corresponding spacer bar 205 or 206. Rotation of this rod will pivotably move the arm relatively to its pivot block 207 to adjust the pitch as desired.

Stage 300 (FIGS. 16, 16A and 17)

After the mandrel has been wound with liner strips and the desired overlying layers of glass reinforced and resin impregnated tape, the pipe, as thus formed, passes to a cut-off unit shown in FIGS. 16 and 16A, the wiring circuitry being as shown in FIG. 17. This unit passes the thus formed completely wound pipe layers or plies to a point adjacent the trailing end of the mandrel section in which they are enclosed and thereupon severs the thus wound pipe to produce what is herein termed a "preform" P so that it and its mandrel section may be promptly detached from the following portions of the pipe and mandrel and discharged from the machine by mechanism hereinafter described.

The cut-off unit of FIG. 16 directly follows the last of the winding stands. It is positioned between two upright parallel rigid frames 301 and 302 (FIG. 1A) of the machine. Between these frames and rigidly secured thereto are two parallel guide rods 303. These rods serve as a support for end plates 304 and 305 of the cut-off unit. Said plates are held in spaced parallel relation to one another by three tie bolts 306 which extend through tubular spacers 307. Tubular spacers 308 embrace the guide rods 303 between the end plates 304 and 305 and these latter tubular spacers are provided with internal anti-friction bearings which engage the said guide rods and thus serve to support the end plates and all parts mounted thereon for rectilinear sliding movement axially of the mandrel.

Mounted on the inner side of the end plate 304 is the inner race of a bearing 309 coaxial with the mandrel and adapted to cooperate with the outer race of such bearing mounted on the interior of a cutter blade carrier 310. On the exterior surface of the blade carrier is supported an inner race 311 adapted to cooperate with the outer race of a bearing supported within a cam 312 which is rigid with a cam gear 313.

In assembling these parts, the blade carrier 310 with bearing race 311 supported thereon is passed through the cam 312 and the outer race in the blade carrier 310 is engaged with the race of the bearing 309 supported on the end plate 304, so that these parts nest with one another.

Rigidly supported on the blade carrier 310 is a skeletonized blade gear 314. On this gear are three sets of arms shown in the drawings as bell cranks, each carried by a pivot 315. Each bell crank is in practice preferably made with two relatively movable pivotal arms which may be angularly adjusted with respect to one another as shown in FIG. 16A. The arm 316 of each set is a knife arm and carries a rotatable cutter 317. The other arm 318 is a cam follower arm and carries a cam follower 319 adapted to cooperate with the interior surface 320 of the cam 312. Associated with each set of arms is a spring 321 which maintains the cam follower thereof in contact with the surface 320 of the cam 312. The cam surface 320 is in three sections, each of which corresponds to one of the cam followers 319.

When the cam and blade carrier are moved at different speeds the contour of the cam is so arranged as to cause the cutting knives 317 to move through an arc whose outermost portion leaves sufficient clearance to pass the wound pipe through the space between the three cutting knives 317, but, as hereinafter explained, to thereafter cut through the wall of the pipe sufficiently to sever the leading portion of the pipe from the following portion thereof. The length of the cutting arc traversed by the cutting knives is always the same and depends upon the contour of the cam surface 320. However, the position of this arc of motion can be varied by adjusting the angle between the cam follower arm 318 and the knife arm 316 of each set of arms. Thus, various diameters of pipe may be accommodated by the cut-off mechanism.

The surface 320 of the cam has three equally spaced apart notches 322 in which the cam followers 319 respectively rest when the cut-off mechanism is not actually going through its cutting cycle. These notches are so shaped that said followers will roll out of the notches 322 if the cam gear 313 is moved in one direction with respect to the blade gear 314, but will remain in the notches if the blade gear only is rotated. When rotating force is applied to the blade gear 314 and the cutting cycle is not taking place, the cam gear 313 and blade gear 314 will rotate at exactly the same speed because of engagement with the cam followers 319 with the notches 322. However, if the cam gear 313 is caused to rotate at a higher speed than the blade gear 314, the cam followers will move out of the notches in the cam and the cutting knives will move through their cutting arcs to sever the formed pipe.

The severing of the pipe by the cutting mechanism described is so arranged that the cut will always take place at one of the couplings shown in FIGS. 2–4 and will be so controlled that, when the knives have cut through the wall of the pipe, they will engage with one of the non-magentic sleeves 14 of the coupling.

Since the mandrel and formed pipe thereon are moving at a constant speed through the machine, and since the severing operation must necessarily have a period of duration, it follows that the cutting knives must also move axially with the mandrel and at the same forward speed thereof so as to effect proper location for the cutting operation. The mechanism for assuring this result is shown in the lower portion of FIG. 16. It serves to move the entire unit and the cutting knives forwardly, i.e., to the right in FIGS. 16 and 1A, at the same linear speed as the mandrel and to thereafter return said unit to the left hand end terminus of its travel to complete the cycle of each cutting operation.

Cutter and take-off shaft 323 (FIGS. 5 and 16) is driven from the main machine drive, as shown in FIG. 5, through sprocket and chain connection with the right angle gear reducer 15, at a speed which is always proportional to the linear speed of the mandrel. This shaft is mounted in suitable bearings 324 (FIG. 16) and rigidly attached to said shaft are the stators of electric magnetic clutches 325 and 326. To the armatures of these clutches are rigidly attached sprockets 327 and 328, respectively.

Sprocket 327 drives sprocket 327a which is rigidly attached to shaft 329. This shaft is the input shaft of a right angle gear reducer 330. Shaft 329 extends through the case of the gear reducer and has rigidly mounted on its opposite end a gear 331. This gear meshes with a gear 332 rigidly attached to shaft 333 which is rotatably mounted in bearings 334. Shaft 333 carries a sprocket 335 driven from the sprocket 328, rigidly attached to armature of electromagnetic clutch 326.

Shaft 323 rotates in one direction only. However, the output shaft 336 of gear reducer 330 will rotate either clockwise or counterclockwise depending on whether electromagnetic clutch 325 or electromagnetic clutch 326 is energized. The reason for this is that a reversal of direction is obtained by gears 331 and 332. If electromagnetic clutch 325 is energized and electromagnetic clutch 326 is not, the input shaft 329 of gear reducer 330 will receive its rotational energy from sprocket 327a. The rotational motion will still be transmitted through gears 331 and 332, and 335 and 328, to electromagnetic clutch 326, but this one is de-energized and will thus slip. With this condition existing, output shaft 336 of gear reducer 330 will turn in one direction. If, on the other hand, electromagnetic clutch 326 is energized and electromagnetic clutch 325 is de-energized, the input shaft 329 of gear reducer 330 will receive its rotational energy through sprockets 328 and 335, shaft 333 and gears 332 and 331. In this case, electromagnetic clutch 325 will slip and the output shaft 336 of gear reducer 330 will rotate in the opposite direction.

Rigidly attached to output shaft 336 is sprocket 337 which drives chain 338 and sprocket 339. Sprocket 339 is rigidly attached to shaft 340 and sprocket 341 is also rigidly attached to this shaft. A chain 342 is engaged by sprockets 341 and 343, which latter is rigidly mounted on the shaft 344 rotatably mounted in suitable bearings attached to the frame of the unit, not shown in this figure. The gear ratios and sprocket sizes are so chosen that said upper reach of chain 342 will travel exactly the same linear speed as the mandrel M. Rigidly attached to said upper reach of chain 342 is a block 345 which is in turn rigidly attached to the lowermost tubular spacer 307. Thus, when chain 342 moves in response to energization of either electromagnetic clutch 325 or electromagnetic clutch 326, the end plates 304 and 305 and all parts carried thereby will also move at exactly the same speed as the mandrel.

A secondary driving motor 346 is rigidly mounted on end plate 305. This motor runs at all times when the machine is in operation and serves to drive a pulley 347 fixed on a shaft 348 rotatably mounted in bearings in end plates 304 and 305. Rigidly attached to this shaft is pinion gear 349 which meshes with and drives the cutter gear 314 of the blade carrier. Thus, while secondary driving motor 346 is running, the cutter gear 314 will rotate and carry with it cam gear 313 at exactly the same speed, as previously explained. Also rigidly attached to shaft 348 is the stator of electromagnetic clutch 350. Rigid with the armature of this electromagnetic clutch 350 is a sprocket which drives a shaft 351 (FIG. 16) rotatably mounted in the end plates. Thus, if electromagnetic clutch 350 is energized, driving force will be transmitted to shaft 351. Fixed on this shaft 351 is pinion gear 352 which meshes with and drives cam gear 313.

Cutter gear pinion 349 and gear pinion 352 both contain the same number of teeth. However, cam gear 313 contains a smaller number of teeth than cutter gear 314. Thus, if electromagnetic clutch 350 is energized, cam gear 313 will rotate at a higher speed than cutter gear 314. This will cause cutting knives 317 to move through their cutting arcs as hereinbefore stated.

Since, as previously explained, cam followers 319 rest in the notches 322 of cam surface 320 at all times except during the cut-off cycle, it is necessary to accurately determine when cam 312 has completed one-third more of each of its revolutions than blade gear 314. This will allow cam followers 319 to again rest in the notches in cam surface 320 and await the initiation of the next cut-off cycle. The accurate determination of this one-third revolution is accomplished as follows:

Rigidly attached to the right hand end of shaft 351 is the armature of an electromagnetic clutch 353. To the stator of this clutch is attached sprocket 354 having a chain drive connection with sprocket 355. Sprocket 355 is rigidly attached to a shaft 356 rotatably mounted on the armature shaft of an electromagnetic brake 357. The stator of this electromagnetic brake is rigidly attached to end plate 305. Thus, if the electromagnetic clutch 353 is energized it will drive shaft 356 and rotate a worm 358 which is rigid with said shaft, provided said electromagnetic brake is de-energized. This worm drives worm gear 359. Rigid with worm gear 359 is timer cam 360, provided with a contour such that a timer switch 361 will be actuated both at the beginning and at the end of each cutting cycle.

The ratio for sprockets 354 and 355, worm 358 and worm gear 359 is such that timer cam 360 is caused to complete one revolution, while cam 312 is completing exactly one-third of a revolution with respect to cutter gear 314.

Because electromagnetic clutch 353 will provide some torque transmission even in its de-energized state, which would cause worm 358 to "creep" when the cutting cycle is not taking place, electromagnetic brake 357 is used to apply a friction to shaft 356 at all times except during the cut-off cycle and thus prevent creeping of said worm. Electromagnetic brake 357 and electromagnetic clutch 353 cannot both be energized at the same time. Thus, during the cutting cycle, electromagnetic clutch 353 is energized, and electromagnetic brake 357 is de-energized. The reverse condition maintains at all times except during the cut-off cycle.

As will be apparent from the electrical control circuitry of FIG. 17, timer switch 361 is used to de-energize electromagnetic clutch 350 so that cam 312 will complete exactly one-third of a revolution with respect to cutting gear 314 during each cutting cycle.

As hereinbefore pointed out, the fully wrapped pipe preform P is severed from the mandrel when the non-magnetic coupling (FIGS. 2–4) enters the inductive field of a sensing head 362. This sensing head is of conventional, commercially available character. It provides output voltage suitable for actuating a relay when magnetic material is placed within the sensitive field of the head. It does not provide an output voltage when non-magnetic material is presented within the sensitive field of the head. In this manner, a relay may be energized or de-energized, depending on whether magnetic or non-magnetic material is presented in its field of sensitivtiy. The action of the sensing head, as it initiates an electrical impulse required to perform the cutting operation, is best understood by referring to FIG. 17. Conductors 365 are connected to a commercially available source of 24 volts direct current. This 24 volt direct current is used to supply the electromagnetic clutches on the cut-off mechanism. At the same time it is used to accomplish the necessary electrical control functions on the unit. Two conductors 366 lead to sensing head 362.

When non-magnetic material passes under the sensing head, 24 volts direct current will no longer be applied to these conductors 366. When this happens, relay 367 is de-energized and through its normally closed contacts will energize electromagnetic clutches 325 and 350, timer clutch 353, and de-energize electromagnetic brake 357. At this time the cutting cycle relay 368 is de-energized because the frame 304 is holding switch 371 in its open position. Thus the cutting cycle will be initiated, the knives will start to feed in toward the preform, the cutting head will traverse at exactly the same forward speed as the mandrel, and timer cam 360 will begin to rotate, which will cause timer switch 361 to open from its normally closed position and cause cutting cycle relay 368 to remain de-energized. After the cutting knives have moved in and completed their cutting action, and when the cutting head has completed exactly ⅓ of a revolution, timer cam 360 again actuates timer switch 361 so that it can return to its normally closed position. When this occurs, relay 368 is energized, thus stopping the action of clutch 325 and timer 353 and energizing brake 357.

However, the clutch 350 is not disengaged at this time in order to allow continuation of the traversing of the cutting head at exactly the same forward speed as the mandrel. This action is necessary because the non-magnetic coupling must have a definite length in order to be positioned within the sensitive field of the cutting head. However, this same necessity for a definite length means that the cutting cycle must be long enough at various linear rates of preform production, such that on the return to the at rest position of the cutting head the sensing head 362 will have returned to a position over the magnetic material of the mandrel. This action is accomplished, regardless of traversing speed of the preform, by traverse switch 364 which is actuated by a bar 363 attached to block 345 shown in FIG. 16.

The length of this bar is such that the cutting head will travel in the same direction as the mandrel for a definite distance before allowing it to reverse and go in the opposite direction. A study of FIG. 17 will reveal that this same switch 364 maintains energization of clutch 325 until it is released to its normally open position by the action of the bar 363 attached to block 345 (FIG. 16). Once switch 364 is released to its normally open position, relay 370 is energized, which in turn energizes reverse clutch 326. Relay 370 also draws power through a set of normally open terminals on relay 368.

Thus, since the cutting head is now travelling in the reverse direction, de-energization of relay 368 will complete the cutting cycle. This is accomplished by switch 371.

*Stage 400 (FIGS. 18 and 19)*

After the preform P has been severed in the manner described, the pusher unit continues to advance the entire mandrel and preform until the foremost section M1 of mandrel, with preform thereon, is located beyond the frame 302 (FIG. 1A).

It is now necessary to separate the severed length of preform and to move it aside from the line of traverse of oncoming partially completed unsevered preforms. These functions are accomplished by the mechanism shown in the FIGS. 18 and 19.

Rock shafts 401 and 402 have attached to them arms which carry rollers 403 and 404, respectively. These rollers form a cradle for the severed preforms. When the severed end of the preform progresses through the unit shown in FIG. 18 to the point where it actuates puller start switch 405, relay 406 (FIG. 17) is energized. This energizes puller clutch 407 which is driven by shaft 378 (FIG. 16) through appropriate chains, sprockets and gear reducer, from shaft 323 (FIG. 16). Shaft 378 rotates at a speed which is exactly proportional to that of the mandrel and preform.

Cam 408 containing cam groove 409, cam 410 and control cam 411, are all pinned to a common shaft. In groove 409 of cam 408 a follower roll projects which actuates lever 412. Lever 412 is in turn attached to the assembly of clamp 413, arm 414 and air cylinder 415, through link 416. This entire assembly is slideably mounted on parallel slide bars 417 and 418 (FIGS. 18 and 19).

As the assembly of cams begins to rotate, clamp 413 accelerates until it reaches the same linear speed as the mandrel and preform. At this point control cam 411 actuates air valve controller 419, to admit compressed air to air cylinder 415 which, through a toggle mechanism 420 (FIG. 19), closes clamp 413 and firmly grasps the assembled mandrel and preform. The cam groove 409 on cam 408 then accelerates clamp 413 which pulls with it the assembly of the foremost mandrel section M1 and preform P thereon to separate them from the following windings and mandrel sections by pulling the part 2 of the coupling (FIG. 2) from the part 1 thereof.

This will allow a gap to form at the rear end of the foremost mandrel section and the preceding mandrel sections, with the result that switch 429 (FIGS. 1A, 17, and 18) assumes its normally closed position, thus keeping the circuit complete when rotating cam 411 opens switch 428, allowing the puller clutch 407 to remain energized and the dumping cycle to be completed. After a sufficient space has been obtained between the oncoming section of mandrel and preform of the severed section, control cam 411 serves to reverse pressure in the air cylinder 415 to open clamp 413.

At this point cam track 421 and cam 410, which thus far in the cutting cycle had been at a constant radius and caused no motion of arm 422, now changes in such manner as to move arm 422. Through the action of linkages attached to arm 422 and bell cranks 423 and 424 acting on arms 425 and 426, rock shafts 402 and 401, respectively, are forced to rotate. Shaft 401 rotates in such manner that rollers 403 move through an arc more rapidly than do the rollers 404. Thus the separated mandrel section M1 and preform P are no longer trapped between an assembly of four rollers, but are allowed to move sideways until an angle is reached at which the severed preform and mandrel assembly will roll down an inclined table not shown in the figure. Shafts 402 and 401 then return rollers 403 and 404 to their at rest position shown in FIG. 18, such that they will entrap the oncoming section of mandrel and preform. At the same time, cam track 409 on cam 408 has been returning the assembly of clamp 413 and cylinder 415 to its at rest position and control cam 411 actuates puller cycle stop switch 427 (FIG. 17) to de-energize relay 406 and stop the action of the puller unit.

In the event of malfunction of the cutting unit such that a severing of the mandrel and preform had not occurred, safety switch 429 is provided (FIGS. 1A, 17 and 18). Switch 429 is held in the open position by the unsevered preform while switch 428 is held in the closed position by cam 411. Upon actuating switch 405, puller clutch 407 is engaged and cams 408, 410 and 411 start to rotate. After approximately one-third revolution, controller 419 is actuated admitting air to air cylinder 415 (FIG. 19) causing the clamp 413 to engage the preform.

Cam groove 409 of cam 408 accelerates lever 412 which through link 416 accelerates the clamp assembly of which the clamp 413 forms a part. Clamp 413 will slip on the preform if the preform has not been severed as previously described. At this point cam 411 opens switch 428, switch 429 being held open by the preform, with both of these switches held in open position, puller clutch 407 is de-energized and the dumping is made impossible. Inasmuch as the mandrel as a whole is continuing to move to the right in FIG. 18, it will in due course operate the switch 430 which is operatively connected within the main electrical feed circuit of the machine and causes that circuit to be broken and the machine stopped.

It will be noted from FIG. 1A that a switch 431 is positioned between the units 300 and 400 and has a feeler adapted to bear upon the preform as it is fed to the pulling and discharge unit 400. The purpose of this switch is to prevent repeated cycling of the cutting head when no preform is present. Since air is non-magnetic, cycling will occur where this switch not held open by lack of a preform.

*Stage 500 (FIGS. 20–22)*

FIGS. 20–22 show mechanism for insuring appropriate support for the mandrel and the winding thereon during travel of the mandrel. One of these mechanisms is secured to the upright frame 201 at the outlet end of each of the winding units. Each comprises an apertured plate 501 rigidly secured to the frame by bolts 502 which pass through spacing pillars 503 and mount a cam plate 504 coaxial with the plate 501. The bolts 502 pass through arcuate slots 505 in the cam plate to permit circumferential adjustment of the latter.

The plate 501 is in the form of a ring, to the inner periphery of which are pivoted a plurality of arms 506 and 507 spaced equidistantly about said plate. The arms extend through the cam opening 508 in the cam plate and beyond said opening the arms are bifurcated to receive rollers. The uppermost arms 506 each carry a single roller 509. The single lower arm carries a rocker 510 pivoted intermediate its ends at 511 to the arm 507 and carries rollers 512 adjacent each end of the rocker. These rollers are tilted in opposite directions as shown best in FIG. 21. When the nuts of the bolts 501 are loosened the cam plate 504 may be rotated to cause all of the rollers 509 and 512 to engage with the pipe on the mandrel and not only support said pipe, but also accurately guide it into registration with the next unit. The purpose of using the rocker 510 for the lowermost rollers is that it will rectify the position of the mandrel as the forward end of the latter is passed over these rollers and, even though there be a tendency of the mandrel to sag, its end will engage the first roller which may cause slight tilting of the rocker, but will immediately thereafter engage with the second roller to level off the rocker and properly position the forward end of the mandrel.

The purpose of the cam shaped opening 508 is to permit adjustment of the rollers 509 and 512 to accommodate different diameters of mandrels and the windings thereon.

A spring 513 associated with each of the arms 506 and 507 serves to cushion the action of the cam surfaces in holding the rolls in contact with the mandrel-wrapping assembly.

*Stage 600 (FIGS. 23–25).—Removal of the mandrel*

After the preform P with mandrel section M1 therein has been discharged from the apparatus shown in FIGS. 1 and 1A, the next step in the method of this invention embodies the removal of this mandrel section from the preform. At this point one of the coupling parts shown in FIGS. 1–3 remains secured to each end of the mandrel, one end of which is shown in FIG. 23. One of these coupling parts 1 is first removed from the mandrel by attaching to the tapped hole 12 in the outer end of said part, a rod 601 provided on its free end with a head 602. Embracing the rod 601 is a percussion sleeve 603 loosely fitted over the rod, as shown in FIG. 23.

It will be noted that the percussion sleeve 603 is provided in its end contiguous to the coupling, with a square socket 8a corresponding to and adapted to receive the square tang 8 of the male unit 1 of the coupling. Consequently if the sleeve 603 is moved to engage the socket therein with the tang 8, said sleeve may be grasped by hand or otherwise and rotated in an anticlockwise direction, as shown in FIG. 23, to disengage the pin 3 from the undercut portion of the bayonet joint 6 and thus unlock this coupling element from the mandrel section.

While the assembled preform and mandrel are held against longitudinal movement, the percussion sleeve 603 is grasped and driven longitudinally and forcibly against the head 602 to withdraw said coupling part from the free end of the preform. After the coupling part has been removed as stated, there is introduced into the projecting end of the preform a stopper 604 shaped to engage the pin 3 of the mandrel section M1, with an intermediate sealing ring, such as an O-ring 605 (FIG. 24). The stopper is then rotated to securely lock bayonet slots in the stopper to the pin 3 of the mandrel section M1 and at the same time place the O-ring 605 under sufficient compression to provide therewith a leak-proof joint.

There is next introduced into the corresponding end of the preform a chambered plug 606 which is embraced by an elastic sleeve 607. The inner end of the chambered plug 606 is reduced and threaded to receive a lock nut 608 to bear against a sealing ring 609 which is in end abutting relation to the inner end of the sleeve 607. The outer end of the chambered plug is also reduced and threaded to receive a nut 610 and this nut acts against a sealing ring 611 bearing against the outer end of the elastic sleeve and also against the outer end of the preform, as clearly illustrated in FIG. 24.

Projecting into the chamber of the plug 606 is a tube 612, while extending entirely through the chambered plug and into the space S between its inner end and the sotpper 604 is another tube 613.

The assembled parts, as thus far described are positioned within a restraininig member 610a (FIG. 24) which conveniently may be a metal tube longitudinally divided into two opposite semicircular sections with flanges at their opposite ends. This restraininig member is placed about the assembly and the sections thereof held in place therein with the flange at one end of the restraining member bearing against the nut 610 while the flange at the opposite end of the restraining member bears against the corresponding end of the preform.

After the parts have been assembled as stated, the outer end of the tube 612 is connected to a source of compressed air. Such compressed air is introduced into the chambered plug 606 and passes therefrom through perforations 614 into the interior of the elastic sleeve 607. The pressure thus applied to the interior of the sleeve is sufficient to expand said sleeve radially against the inner surface of the preform and produce enough friction between the sleeve and the preform to firmly secure the chambered plug 606 in position.

After the plug 606 is thus anchored in place within the end of the preform, compressed air is introduced through the tube 613 and builds up pressure in the chamber S between the plug and the stopper 604. The pressures applied within the chambered plug 606 and within the space between that plug and the stopper 604 are so regulated that the pressure in the former will be in excess of that in the latter with, for example, a pressure differential of 20 p.s.i.g. The pressure applied between the stopper and the chambered plug 606 will not only be exerted against the stopper 604, but will also seep in between the preform and the outer surface of the mandrel section, so that it will produce a film or pellicle of compressed air externally of the mandrel and within the preform, whereby the preform will be slightly expanded to free its grip on the mandrel section. At the same time, the pressure against the outer end of the stopper will be impressed against the stopper 604 with the result that the mandrel section, along with the stopper 604, will be ejected from the preform, for the friction between the elastic sleeve 607 and the preform will be sufficient to hold the chambered plug 606 in position during this operation.

After the mandrel section has been thus removed from the preform, the chambered plug 606 may then be removed by venting the chamber thereof to the atmosphere, leaving the preform unencumbered and ready to be passed to the molding and curing operations next to be described. The coupling part 1 which was removed from one end of the mandrel section as just described is then replaced in such mandrel section and said mandrel section may be used over again as hereinbefore described.

*Stage 700 (FIGS. 26–29).—Molding and curing*

In the carrying out of the molding and curing operation on the preform, there is provided a metal tube 701, preferably of aluminum, into each of the open ends of which extends the reduced end of a tube plug 702 to which the tube is secured by a series of flat head screws 703. The tube 701 is provided with perforations 718 as shown. Tube 701 and its associated plugs 702 are next telescoped into an elastic sleeve or bladder 704 which may be of any appropriate elastomer, such, for example, as a silicone or butyl elastomer.

The telescoping of these parts is accomplished in the following manner. As viewed in FIG. 26, the left hand end of the bladder is temporarily closed and, as the tube 701 is introduced into the right hand end of the bladder, air under pressure is applied through a fitting 713 into the interior of the tube 701. During this operation the perforations 718 in the tube are sealed. All of them are sealed at the beginning of the telescoping operation, but they are progressively unsealed in any suitable manner as the tube 701 progressively enters into and proceeds longitudinally into the interior of the bladder, so that there is always a pressure during the introduction operation within the tube 701 and from such interior through the perforations 718 as they are successively unsealed. The pressure which thus passes into the interior of the bladder through the unsealed perforations 718, acts against the interior surface of the bladder to progressively expand longitudinal portions thereof as the tube is entered thereinto and in this manner the telescoping of these parts is efficiently and expeditiously performed. After these parts have been telescoped as stated, the temporary seal at the left hand end of the bladder in FIG. 26 is discontinued so that that end of the bladder is now open. The parts 701 and 702, telescoped as described, are inserted as a unit into the preform P.

A protective sleeve 705 of, for example, nylon, is positioned within the opposite ends of the preform and extends beyond said ends, as shown in FIG. 26. There is next telescoped over the end of each end plug 702, a pullout element 706, the outer surface of which is flush with the outer surface of the preform.

There is then applied over the assembly a diametrically split sleeve 707, preferably of aluminum. This split sleeve projects beyond the ends of the pull-out element 709 and is provided at each end with internal quadrants 711 held in place by screws 708. Each pull-out element 706 has a reduced portion 709 into which the quadrants 711 project and at one end of each reduced portion is a shoulder 710. The quadrants 711 hold the inner end of the pull-out element in edge abutting relation with the adjacent end of the preform. The outer end of each pull-out element has pull-out lugs 712, the purpose of which will presently be explained. One of the plugs 702 is provided at its outer end with the inlet tube 713, while the corresponding end of the other plug 702 is sealed at 714 (FIG. 29).

After the parts thus far described are assembled as stated, they are introduced into a jacketed mold formed by inner and outer tubes 715 and 716 which are bolted together with appropriate packing to produce an intermediate jacket chamber 717. The inner surface of the mold wall 715 is preferably honed out to a precise bore of the proper diameter, so as to properly support the aluminum tube 707 during the molding and curing operations. The semi-circular tube sections of this aluminum tube are in a sense protectors, the inner surfaces of which are smooth, so as to assure a nice finish on the exterior of the finished pipe. In practice, the inner and outer surfaces of the tube 707 are preferably coated with a release agent, Teflon such as (tetrafluoroethylene), to preclude adhesion to the adjacent parts against which they bear.

A pipe made according to FIG. 26 will be of uniform outer diameter throughout its length. However, if desired, the inner surface of the split aluminum sleeve 707 may be so formed as to provide a connecting means, such as thread or internal coupling devices, so that, during the subsequent molding operation the same may be molded into the pipe.

The molding of the preform within the mold is accomplished by the introduction of radial pressure against the interior of the preform, with concurrent softening of the resins through the application of heat to such preform. The application of pressure to the interior of the preform is accomplished through the introduction of an appropriate fluid, such as air or nitrogen gas, from the inlet tube 712 into the interior of the tube 701 and through spaced perforations 718 thereof against the inner surface of the elastomer tube or bladder 704 which is thus caused to press against the inner surface of the preform and squeezes it in an outward direction to re-orient and consolidate all the parts and render its structure more dense. The application of heat to the preform during this outward radial pressure is accomplished through the feed of hot water and steam through a series of connections 719 arranged longitudinally of the mold, as shown in FIG. 29.

In practice, there is first introduced into the jacket 717 of the mold hot water for the purpose of effecting a preliminary softening of the resins of the preform. The particular temperature of the water employed in this connection will of course vary with the particular resin in the preform. As the pressure is increased within the preform by the feed of fluid through the inlet tube 713, there results an expansion of the interior plies or layers of the preform windings, responsive to such pressures. As this expansion continues, the outside ply meets and conforms to the mold and the inner plies simultaneously expand due to compression of the wall of the preform by the elastomer tube. Any air which may have been trapped between the respective plies is thus expelled and escapes between the edges of the split sleeve 707, so that by the time all of the plies of the preform have been sufficiently heat softened, the wall of the preform will have been thoroughly and appreciably compacted against the mold.

The treatment with water at elevated temperature constitutes a definite step in the carrying out of this method and is in effect a preliminary heating step during which the resins in the preform are sufficiently heated to permit the change of the conditions described. The period involved in this particular step will depend of course upon the particular resin which is involved.

After the preliminary step of resin softening just described, the water employed therein is withdrawn and steam is introduced into the jacketed chamber 717 at progressively timed periods of higher temperatures. Here again the temperatures and periods employed for these progressive heatings will vary with the resins involved. By this modus operandi the resins involved in any case will be liquefied to such extent as to readily flow. In so doing they thoroughly distribute themselves throughout the entire preform so as to render the latter a substantially homogeneous structure.

At the same time this step involving the steam heat application completes the densification of the wall of the preform which was initially commenced during the hot water heating phase.

During this preliminary steam heating the wall of the preform is compacted to its maximum density which is desired in the finished pipe. The remainder of the heating cycle with its inherent higher temperatures cures the resins of the preform, so that the preform may then be reduced to room temperature by cooling the mold in any suitable manner as by circulating a cooling medium through the jacket thereof.

After the pipe has been cured and cooled in the manner described, the interior of the tube 701 is vented to permit the autogenous collapse of the elastomer tube against its outer surface. Appropriate withdrawal means, such as a winch operated cable having a fitting engaged with the lugs 712 at one end of the assembly, may be operated to pull the split sleeve 707 and all parts contained therein from the mold. The sections of the split tube 707 may then be removed, the pull-out elements withdrawn, and the plugs 702 with the protective sleeve 705 and the tube 701 may then be readily withdrawn from the interior of the pipe to leave the pipe unencumbered. The opposite ends of the pipe are thereafter preferably cut off and the pipe thus becomes the end product article of manufacture of this invention, ready for use in the field with whatever type of joints that it may be desired to associate therewith for securing a succession of sections of these pipes to one another.

During the foregoing stages, certain interesting phenomena take place. For example, it has been found that the expansion of the inner plies of the preform progressively shortens said plies in a direction longitudinally of such preform as they are expanded into the ultimate densified condition of the preform wall. This is due to the fact that the reinforcing glass fibers, which extend longitudinally of the tapes from which the wrappings were formed, have a high strength and high modulus of elasticity and consequently will not stretch, but will be subjected to a tensile load which will cause the successive plies to shorten as they are expanded, by an amount proportional to the expansion of each successive ply, thereby shortening the pitch of the helical path of the reinforcing strands in the same proportion. Thus, as the successive plies are expanded, the pitch of the reinforcing glass helices in said plies decreases, and as it decreases, the ends of the respective plies are drawn toward the longitudinal center of the preform. There results a different helical pitch for the reinforcing glass fibers of the several plies and laminations of the preform and consequently such re-arrangement of the helices throughout the preform as to produce maximum radial strength in the end product. By virtue of this longitudinal shortening of the successive plies, there results a tapering of the wall thickness at the opposite ends of the preform which is substantially proportional to the increase in diameter of each successive ply.

In the end product pipe of this invention, the tension in all of the reinforcing strands of the pipe approaches zero, but said strands are still under some slight tension. The important feature of the pipe of this invention is that the tension in all of the reinforcing strands of all of the plies is the same, due to their ability, during the molding operation, to modify the helical pitch in order to accomplish this end. Consequently, when internal stress is applied to the pipe in use, as by fluid pressure passing therethrough, it is applied equally to all of the reinforcing strands of such pipe, a characteristic which has heretofore been unknown in wrapped, compacted reinforced pipe.

During the molding and curing operations the liner adapts itself to increased internal diameter of the superimposed glass reinforced tapes and becomes a homogeneous part of the end product pipe.

As hereinbefore pointed out, the curing of the preform to produce the finished pipe wall in some cases involves different temperatures, pressures, and periods of time of the several steps, depending upon the particular binders used in the formation of the preform. However, the following examples are given as illustrative of practice which we have carried out and which have given excellent results.

EXAMPLE I

*Curing of epoxy resin impregnated pipe*

*Step 1.*—Admit circulating water at approximately 180° F. to the mold jacket and simultaneously start to gradually internally pressurize the bladder. The circulation of water is continued for approximately 6 minutes.

*Step 2.*—Admit steam under 20 p.s.i.g. to the jacket for approximately 3 minutes while simultaneously withdrawing the circulating water referred to in Step 1.

After the pressurizing of the bladder has continued to produce an internal pressure of approximately 350 p.s.i.g., further pressurizing is discontinued and this pressure is held for the remainder of the curing cycle.

*Step 3.*—Admit steam pressure into the jacket at 40 p.s.i.g. for approximately 3 minutes.

*Step 4.*—Admit steam at 120 p.s.i.g. into the jacket for approximately 17 minutes.

*Step 5.*—Admit cooling water into the jacket for approximately 5 minutes.

*Step 6.*—Vent the bladder to the atmosphere.

*Step 7.*—Remove the resulting cured pipe from the mold.

EXAMPLE II

*Curing of phenolic resin impregnated pipe*

*Step 1.*—Admit circulating water at approximately 180° F. to the mold jacket and simultaneously start to gradually internally pressurize the bladder. The circulation of water is continued for approximately 6 minutes.

*Step 2.*—Admit steam under 13 p.s.i.g. to the jacket for approximately 6 minutes while simultaneously withdrawing the circulating water referred to in Step 1.

After the pressurizing of the bladder has continued to produce an internal pressure of approximately 350 p.s.i.g., further pressurizing is discontinued and this pressure is held for the remainder of the curing cycle.

*Step 3.*—Admit steam pressure into the jacket at 55 p.s.i.g. for approximately 10 minutes.

*Step 4.*—Admit steam at 120 p.s.i.g. into the jacket for approximately 15 minutes.

*Step 5.*—Admit cooling water into the jacket for approximately 5 minutes.

*Step 6.*—Vent the bladder to the atmosphere.

*Step 7.*—Remove the resulting cured pipe from the mold.

The foregoing detailed description sets forth the invention in its preferred practical forms, but the invention is to be understood as fully commensurate with the appended claims.

Having thus fully described the invention, what we claim as new and desire to secure by Letters Patent is:

1. The method of making a tubular article comprising,
   forming a preform by winding a plurality of layers of tape in different helical directions,
   said tape comprising a carrier strip having on one side thereof a plurality of parallel longitudinal reinforcing strands which are substantially nonstretchable and a thermosetting binder;
   enclosing said preform within a peripherally confining mold having a larger diameter than the outer diameter of the preform;
   introducing fluid pressure into the interior of the preform to radially expand the wall thereof against the wall of the mold and to radially outwardly compress the layers of the preform into firm contact with one another to densify the preform and change the helix angle of the helically wound tapes to permit said expansion of the wall of the preform and place the helically wound reinforcing strands under equal tension;
   and heating the preform to soften the binder to reduce resistance to change of the helix angle of the tapes and to cure the binder;
   said heat and pressure being applied at least in part during a common time interval which includes said cure of the binder.

2. The method of claim 1 wherein said reinforcing strands are fiber glass and in which said tape is wound in edge-to-edge abutting relation in each layer.

3. The method of claim 1 wherein the temperature is increased in selected periods of progressively increasing temperature.

4. The method of making a tubular article comprising,
   forming a preform by winding a plurality of layers of tape in different helical directions,
   said tape comprising a carrier strip having on one side thereof a plurality of parallel longitudinal reinforcing strands which are substantially nonstretchable and a binder;
   enclosing said preform within a peripherally confining mold having a larger diameter than the outer diameter of the preform;

substantially simultaneously beginning the application of heat to the preform and fluid pressure to the interior of the preform to soften the preform and radially expand the wall thereof against the wall of the mold and radially outwardly compress the layers of the preform into firm contact with one another to densify the preform and change the helix angle of the helically wound tape to permit said expansion of the wall of the preform and place the helically wound reinforcing strands under equal tension;

and continuing the application of heat after the preform has been expanded to cure the binder while maintaining said pressure.

5. The method of claim 4 wherein said reinforcing strands are fiber glass.

References Cited
UNITED STATES PATENTS

| | | | |
|---|---|---|---|
| 2,312,332 | 3/1943 | Gramelspacher | 152—218 |
| 2,494,273 | 1/1950 | Wigal | 18—19 |
| 2,723,426 | 11/1955 | Pelley. | |
| 2,785,442 | 3/1957 | Boggs. | |
| 2,826,784 | 3/1958 | Pratt | 18—19 |
| 2,854,031 | 6/1958 | Donaldson | 156—178 X |
| 2,862,524 | 12/1958 | Smith | 138—144 |
| 3,068,133 | 12/1962 | Cilker et al. | 156—187 X |
| 3,121,446 | 2/1964 | Richardson et al. | 138—144 |
| 3,143,451 | 8/1964 | Pratt et al. | 156—285 X |
| 3,177,105 | 4/1965 | Wiltshire | 156—218 |

EARL M. BERGERT, *Primary Examiner.*

LAVERNE D. GEIGER, *Examiner.*

C. L. HOUCK, P. DIER, *Assistant Examiners.*